(12) United States Patent
Saito et al.

(10) Patent No.: US 10,740,934 B2
(45) Date of Patent: Aug. 11, 2020

(54) FLOW LINE DISPLAY SYSTEM, FLOW LINE DISPLAY METHOD, AND PROGRAM RECORDING MEDIUM

(71) Applicant: NEC CORPORATION, Tokyo (JP)

(72) Inventors: Shigetsu Saito, Tokyo (JP); Jun Kobayashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/085,238

(22) PCT Filed: Mar. 23, 2017

(86) PCT No.: PCT/JP2017/011601
§ 371 (c)(1),
(2) Date: Sep. 14, 2018

(87) PCT Pub. No.: WO2017/170084
PCT Pub. Date: Oct. 5, 2017

(65) Prior Publication Data
US 2019/0073810 A1    Mar. 7, 2019

(30) Foreign Application Priority Data
Mar. 31, 2016   (JP) .................................. 2016-069925

(51) Int. Cl.
*G06T 11/20*    (2006.01)
*G06T 7/20*    (2017.01)
(Continued)

(52) U.S. Cl.
CPC .............. *G06T 11/206* (2013.01); *G06F 3/14* (2013.01); *G06Q 30/02* (2013.01);
(Continued)

(58) Field of Classification Search
CPC ..................................................... G06T 11/206
See application file for complete search history.

(56) References Cited

U.S. PATENT DOCUMENTS 7,734,513 B2 *  6/2010  Bonner ..................... G01S 5/14
                                                    370/406
7,778,863 B2 *  8/2010  Yoshida ................. G06Q 30/02
                                                    705/7.31
(Continued)

FOREIGN PATENT DOCUMENTS

JP     11-85956 A    3/1999
JP     11-281661 A    10/1999
(Continued)

OTHER PUBLICATIONS

International Search Report for PCT/JP2017/011601 dated Jun. 13, 2017 [PCT/ISA/210].

(Continued)

*Primary Examiner* — Phong X Nguyen
(74) *Attorney, Agent, or Firm* — Sughrue Mion, PLLC

(57) ABSTRACT

The purpose of the present invention is to correct more accurate marketing information. A flow line display system of the present invention includes image-capturing unit, information operation device and display unit. The image-capturing unit captures an image. The information operation device detects an object from the image and identifies a flow line of the object, an orientation of the object, and a time related to the orientation. The display unit displays the orientation of the object and the time related to the orientation together with the flow line of the object.

20 Claims, 29 Drawing Sheets

(51) Int. Cl.
*G06Q 30/02* (2012.01)
*G06T 7/246* (2017.01)
*G06T 7/73* (2017.01)
*G06T 7/70* (2017.01)
*G06F 3/14* (2006.01)
*G06T 11/00* (2006.01)
*G06T 11/60* (2006.01)

(52) U.S. Cl.
CPC ........... *G06Q 30/0201* (2013.01); *G06T 7/20* (2013.01); *G06T 7/246* (2017.01); *G06T 7/70* (2017.01); *G06T 7/73* (2017.01); *G06T 11/001* (2013.01); *G06T 11/203* (2013.01); *G06T 11/60* (2013.01); *G06T 2207/10016* (2013.01); *G06T 2207/30201* (2013.01); *G06T 2207/30232* (2013.01); *G06T 2207/30241* (2013.01)

(56) References Cited

U.S. PATENT DOCUMENTS

| | | | | |
|---|---|---|---|---|
| 7,908,237 | B2* | 3/2011 | Angell | G06K 9/00771 705/14.38 |
| 8,077,915 | B2* | 12/2011 | Thorn | G06Q 10/02 382/103 |
| 8,229,781 | B2* | 7/2012 | Zenor | G06Q 30/02 705/7.31 |
| 8,570,376 | B1* | 10/2013 | Sharma | H04N 7/18 348/159 |
| 8,812,344 | B1* | 8/2014 | Saurabh | G06K 9/00778 705/7.29 |
| 9,269,093 | B2* | 2/2016 | Lee | G06Q 10/06316 |
| 9,306,660 | B2* | 4/2016 | Graube | H04B 7/26 |
| 9,633,328 | B2* | 4/2017 | Sorensen | G06Q 30/06 |
| 9,760,927 | B2* | 9/2017 | Todasco | G06Q 30/0631 |
| 9,852,434 | B2* | 12/2017 | Kuusisto | G06Q 30/02 |
| 10,217,120 | B1* | 2/2019 | Shin | G06Q 30/0201 |
| 2005/0187708 | A1* | 8/2005 | Joe | G08G 1/092 701/431 |
| 2006/0200378 | A1* | 9/2006 | Sorensen | G06Q 10/063 705/7.29 |
| 2009/0268028 | A1* | 10/2009 | Ikumi | G06K 9/00295 348/150 |
| 2009/0319340 | A1* | 12/2009 | Sekine | G06Q 30/02 705/7.29 |
| 2010/0212979 | A1* | 8/2010 | Izutani | H01M 8/04156 180/65.31 |
| 2011/0199461 | A1* | 8/2011 | Horio | G06T 7/20 348/46 |
| 2012/0033853 | A1* | 2/2012 | Kaneda | G06K 9/00221 382/103 |
| 2012/0045149 | A1* | 2/2012 | Arai | H04N 7/183 382/296 |
| 2014/0125451 | A1* | 5/2014 | Sako | H05B 37/029 340/4.2 |
| 2015/0153571 | A1* | 6/2015 | Ballard | H04W 76/10 345/8 |
| 2015/0278608 | A1* | 10/2015 | Matsumoto | G06K 9/00342 348/143 |
| 2016/0309096 | A1* | 10/2016 | Hagisu | G06F 21/60 |

FOREIGN PATENT DOCUMENTS

| | | |
|---|---|---|
| JP | 2001-291108 A | 10/2001 |
| JP | 2006-35071 A | 2/2006 |
| JP | 2007-3448 A | 1/2007 |
| JP | 2007003448 * | 1/2007 ............ G01B 11/00 |
| JP | 2011-248836 A | 12/2011 |
| WO | 2015-129210 A1 | 9/2015 |

OTHER PUBLICATIONS

Written Opinion for PCT/JP2017/011601 dated Jun. 13, 2017 [PCT/ISA/237].

\* cited by examiner

Fig.2

1222 EXTRACTED INFORMATION TABLE

| POSITION | IMAGE-CAPTURING TIME | FACIAL ORIENTATION |
|---|---|---|
| (X1,Y1) | 2016/03/01/9:00:00 | B |
| (X2,Y2) | 2016/03/01/9:00:15 | B |
| (X3,Y3) | 2016/03/01/9:00:30 | A |
| (X3,Y3) | 2016/03/01/9:00:45 | A |
| (X3,Y3) | 2016/03/01/9:01:00 | A |
| (X4,Y4) | 2016/03/01/9:01:15 | C |
| (X5,Y5) | 2016/03/01/9:01:30 | C |

Fig.4

1223 FLOW LINE INFORMATION TABLE

| OUTPUT POSITION | FACIAL ORIENTATION | OUTPUT SIZE |
|---|---|---|
| (X1, Y1) | B | 1.00 TIME |
| (X2, Y2) | B | 1.00 TIME |
| (X3, Y3) | A | 1.50 TIMES |
| (X4, Y4) | C | 1.00 TIME |
| (X5, Y5) | C | 1.00 TIME |

1223-1    1223-2    1223-3

1224 SIZE TABLE

| NUMBER OF ENTRIES | SIZE |
|---|---|
| 1 | 1.00 TIME (STANDARD SIZE) |
| 2 | 1.25 TIMES |
| 3 | 1.50 TIMES |
| 4 | 1.75 TIMES |
| 5 TO 8 | 2.00 TIMES |
| 9 TO 12 | 2.50 TIMES |
| NOT FEWER THAN 13 | 3.00 TIMES |

Fig.15

1225 COLOR TABLE

| NUMBER OF ENTRIES | SIZE |
|---|---|
| 1 | BLACK |
| 2 | GRAY |
| 3 | BLUE |
| 4 | YELLOW |
| 5 TO 8 | GREEN |
| 9 TO 12 | ORANGE |
| NOT FEWER THAN 13 | RED |

1225-1, 1225-2

Fig.16 1226 FLOW LINE INFORMATION TABLE

| OUTPUT POSITION | FACIAL ORIENTATION | COLOR |
|---|---|---|
| (X1,Y1) | B | BLACK |
| (X2,Y2) | B | BLACK |
| (X3,Y3) | A | BLUE |
| (X4,Y4) | C | BLACK |
| (X5,Y5) | C | BLACK |

1226-1, 1226-2, 1226-3

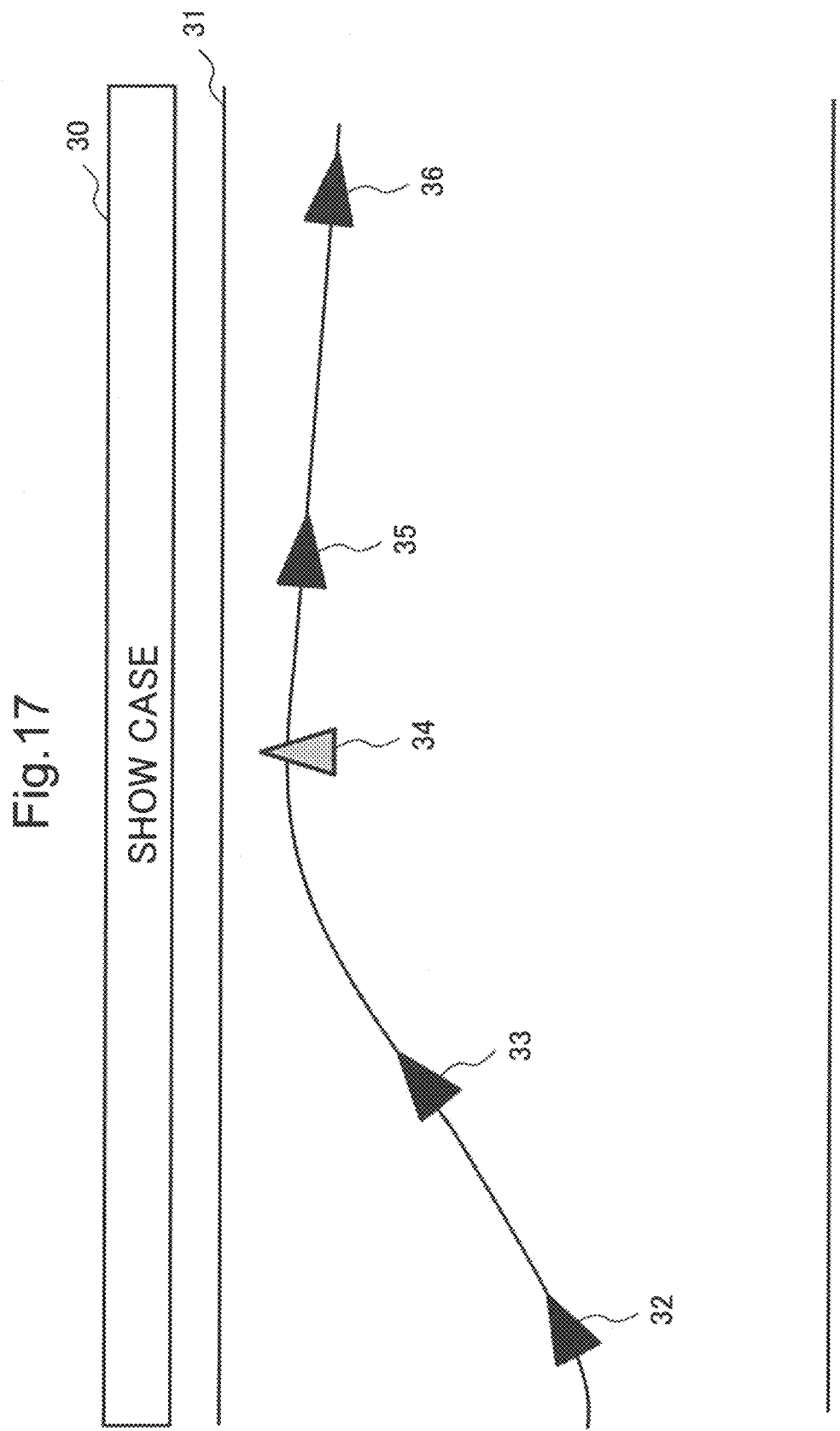

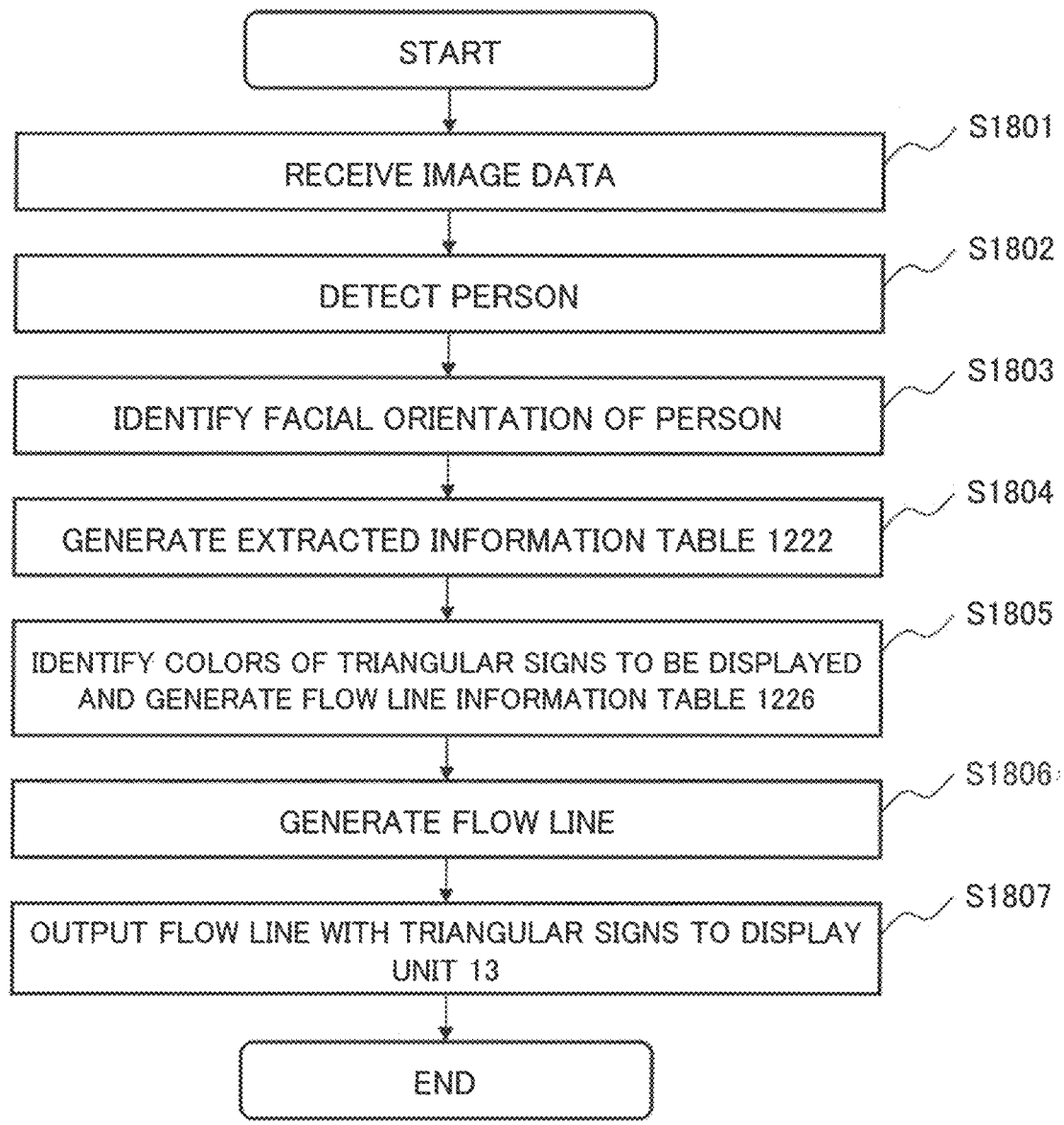

1227 EXTRACTED INFORMATION TABLE

| POSITION | IMAGE-CAPTURING TIME | FACIAL ORIENTATION | HEIGHT OF THE LINE OF SIGHT |
|---|---|---|---|
| (X1, Y1) | 2016/03/01/9:00:00 | B | — |
| (X2, Y2) | 2016/03/01/9:00:15 | B | — |
| (X3, Y3) | 2016/03/01/9:00:30 | A | 1 |
| (X3, Y3) | 2016/03/01/9:00:45 | A | 1 |
| (X3, Y3) | 2016/03/01/9:01:00 | A | 1 |
| (X4, Y4) | 2016/03/01/9:01:15 | C | — |
| (X5, Y5) | 2016/03/01/9:01:30 | C | — |

Fig.26

1229 SPEED INFORMATION TABLE

| SECTION | SPEED |
|---|---|
| FIRST SECTION: (X1, Y1) TO (X2, Y2) | 0.6m/s |
| SECOND SECTION: (X2, Y2) TO (X3, Y3) | 0.6m/s |
| THIRD SECTION: (X3, Y3) TO (X4, Y4) | 1.2m/s |
| FOURTH SECTION: (X4, Y4) TO (X5, Y5) | 1.6m/s |

Fig.27

12210 LINE INFORMATION TABLE

| SPEED | LINE |
|---|---|
| 0.0 TO 0.8 m/s | CONTINUOUS LINE(———) |
| 0.8 TO 1.6 m/s | DASHED LINE(– – – –) |
| NOT LESS THAN 1.6 m/s | DOTTED LINE(·········) |

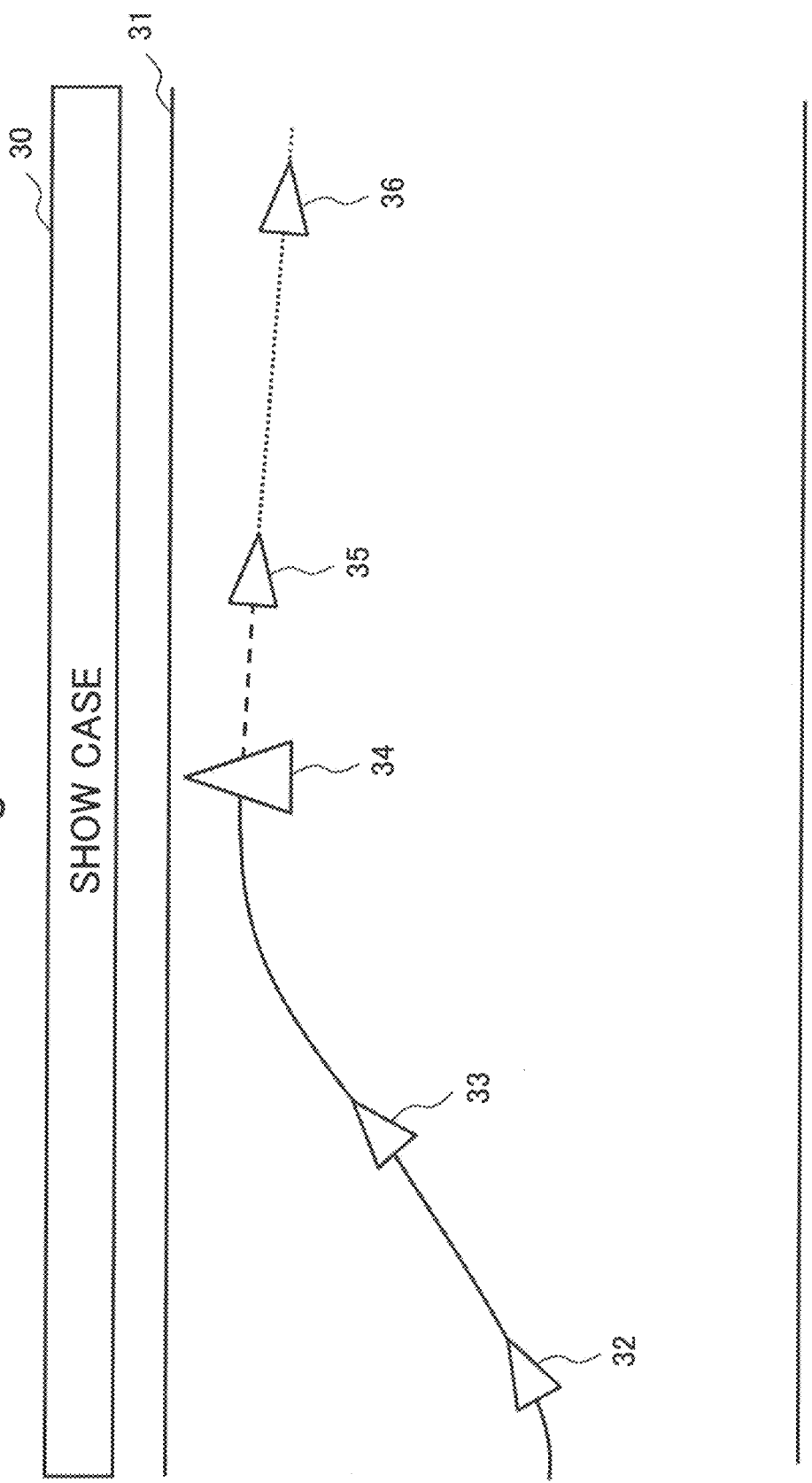

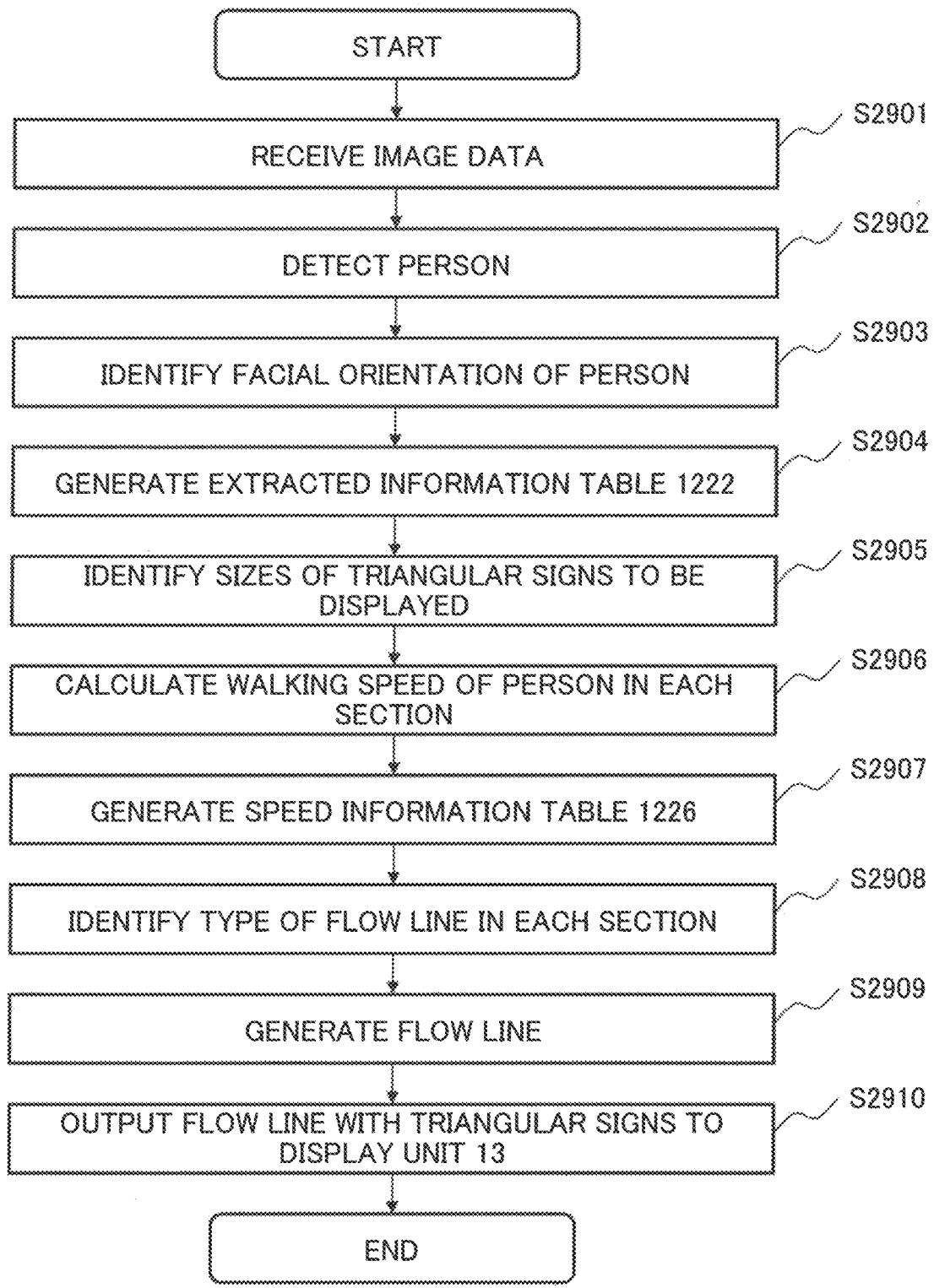

FLOW LINE DISPLAY SYSTEM, FLOW LINE DISPLAY METHOD, AND PROGRAM RECORDING MEDIUM

CROSS REFERENCE TO RELATED APPLICATIONS

This application is a National Stage of International Application No. PCT/JP2017/011601, filed on Mar. 23, 2017, which claims priority from Japanese Patent Application No. 2016-069925, filed on Mar. 31, 2016, the disclosures of all of which are incorporated herein in their entirety.

TECHNICAL FIELD

The present invention relates to a flow line display system, a flow line display method, and a program-recording medium.

BACKGROUND ART

PTL 1 discloses a related art relating to a system for generating information of a flow line of a person by using a video image captured by a stationary camera such as a surveillance camera and for displaying the information of the flow line with information of a direction such as facial orientation added thereto.

CITATION LIST

Patent Literature

[PTL 1] JP 2011-248836 A.
[PTL 2] JP 2007-003448 A.

SUMMARY OF INVENTION

Technical Problem

In PTL 1, however, the flow line is displayed only with the facial orientation of an object such as a person.

An object of the present invention is to provide a flow line display system, a flow line display method, and a program-recording medium that allow the collection of more accurate marketing information by displaying the orientation of an object such as a person and the time related to the orientation together with the flow line.

Solution to Problem

Features of flow line display system of the present invention includes:
  image-capturing unit for capturing an image;
  an information operation device for detecting an object from the image and identifies a flow line of the object, an orientation of the object, and a time related to the orientation; and
  display unit for displaying the orientation of the object and the time related to the orientation together with the flow line of the object.

Features of flow line display method of the present invention includes:
  detecting an object from a captured image;
  identifying a flow line of the object, an orientation of the object, and a time related to the orientation; and
  displaying the orientation of the object and the time related to the orientation together with the flow line of the object.

Features of program-recording medium stores a program for causing a computer to execute:
  a detection step of detecting an object from a captured image;
  an identification step of identifying a flow line of the object, an orientation of the object, and a time related to the orientation; and
  a display step of displaying the orientation of the object and the time related to the orientation together with the flow line of the object.

Advantageous Effects of Invention

The present invention has advantageous effects of allowing the collection of more accurate marketing information by displaying the orientation of an object such as a person and the time related to the orientation together with the flow line.

BRIEF DESCRIPTION OF DRAWINGS

FIG. 2 is a diagram illustrative of extracted information table 1222.
FIG. 4 is a diagram illustrative of flow line information table 1223.
FIG. 15 is a diagram illustrative of color table 1225.
FIG. 16 is a diagram illustrative of flow line information table 1226.
FIG. 17 is a diagram illustrative of an example output of display unit 13.
FIG. 18 is a flow chart illustrative of processing by image-processing unit 121.

FIG. 26 is a diagram illustrative of speed information table 1229.

FIG. 27 is a diagram illustrative of line information table 12210.

FIG. 28 is a diagram illustrative of an example output of display unit 13.

FIG. 29 is a flow chart illustrative of processing by image-processing unit 121.

EXAMPLE EMBODIMENT

Next, a first example embodiment of the present invention will be described in detail with reference to the drawings.

Figure 1:
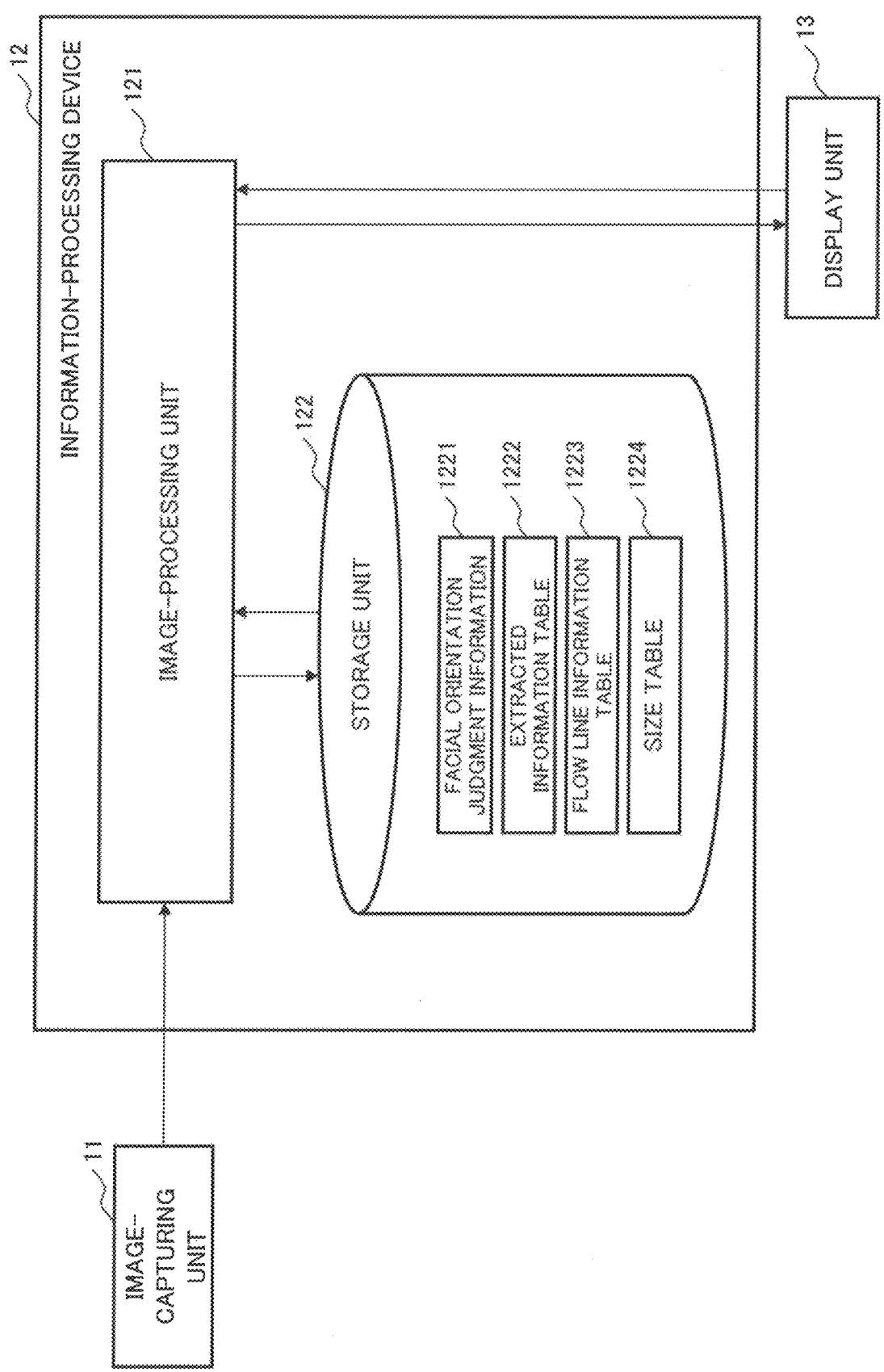
FIG. 1 is a block diagram illustrative of flow line display system 1 in according to a first example embodiment of the present invention.

FIG. 1 is a block diagram illustrative of flow line display system 1 according to the first example embodiment of the present invention.

As illustrated in FIG. 1, flow line display system 1 according to the present example embodiment includes image-capturing unit 11, information-processing device 12, and display unit 13.
Information-processing device 12 includes image-processing unit 121 and storage unit 122.

Image-capturing unit 11 is a camera that captures an image of an object such as a person. Image-capturing unit 11 captures images including video and still images. In the present example embodiment, image-capturing unit 11 will be described as a unit that captures a video image, but the images to be captured by image-capturing unit 11 are not restricted thereto. Further, in the present example embodiment, the camera serving as image-capturing unit 11 will be described as a camera installed in a shop or the like and capturing images in an image-capturing range, which is an area including an aisle in front of a show case, but the position of a camera is not restricted thereto. For example, a camera serving as image-capturing unit 11 is installed on a ceiling, a wall, or a show case of a shop.

Image-capturing unit 11 captures an image in the image-capturing range and sends the image data together with image-capturing time information, which indicates the time when the image was captured, to image-processing unit 121. In the present example embodiment, image-capturing unit 11 will be described as sending the image data together with the image-capturing time information to image-processing unit 121 but the way of sending image-capturing time information to image-processing unit 121 is not restricted thereto and the image data may include image-capturing time information. Further, in the present example embodiment, image-capturing unit 11 will be described as capturing images targeting a person but the target of the images to be captured is not restricted thereto.

Storage unit 122 stores, in advance, information for identifying the orientation of an object as facial orientation judgment information 1221. For example, images of the heads of persons facing the front, the right, and the left are stored as sample images. In the present example embodiment, the facial orientation of the object is identified as an example of an orientation, but the type of orientation is not restricted thereto.

Image-processing unit 121 detects a person from the image data received from image-capturing unit 11. Image-processing unit 121 performs matching between the detected person and the facial orientation judgment information 1221 stored in the storage unit and identifies the facial orientation of the detected person. Further, image-processing unit 121 calculates from the image data the coordinates on the plane of the position of the detected person, generates extracted information table 1222, and stores extracted information table 1222 in storage unit 122.

FIG. 2 illustrates a specific example of extracted information table 1222.

Extracted information table 1222 is constituted by the data in the fields of position 1222-1, image-capturing time 1222-2, and facial orientation 1222-3.

The data in the field of position 1222-1 indicate coordinates on the plane of the position of the detected person (position information).

The data in the field of image-capturing time 1222-2 indicate dates and times when images were captured (image-capturing time information). For example, 2016/03/01/ 9:00:00 indicates 9 o'clock 0 minute 0 second on Mar. 1, 2016. In the present example embodiment, image-processing unit 121 detects a person from the image data every 15 seconds but the interval is not restricted thereto and may be set at any time period.

The data in the field of facial orientation 1222-3 indicate facial orientations (facial orientation information) of a detected person. In the present example embodiment, the facial orientations are associated with signs in advance, and the signs associated with the facial orientations are stored in the field of facial orientation 1222-3. In the present example embodiment, the Roman alphabet letters A to H are used as signs associated with facial orientations but signs are not restricted thereto.

Figure 3:
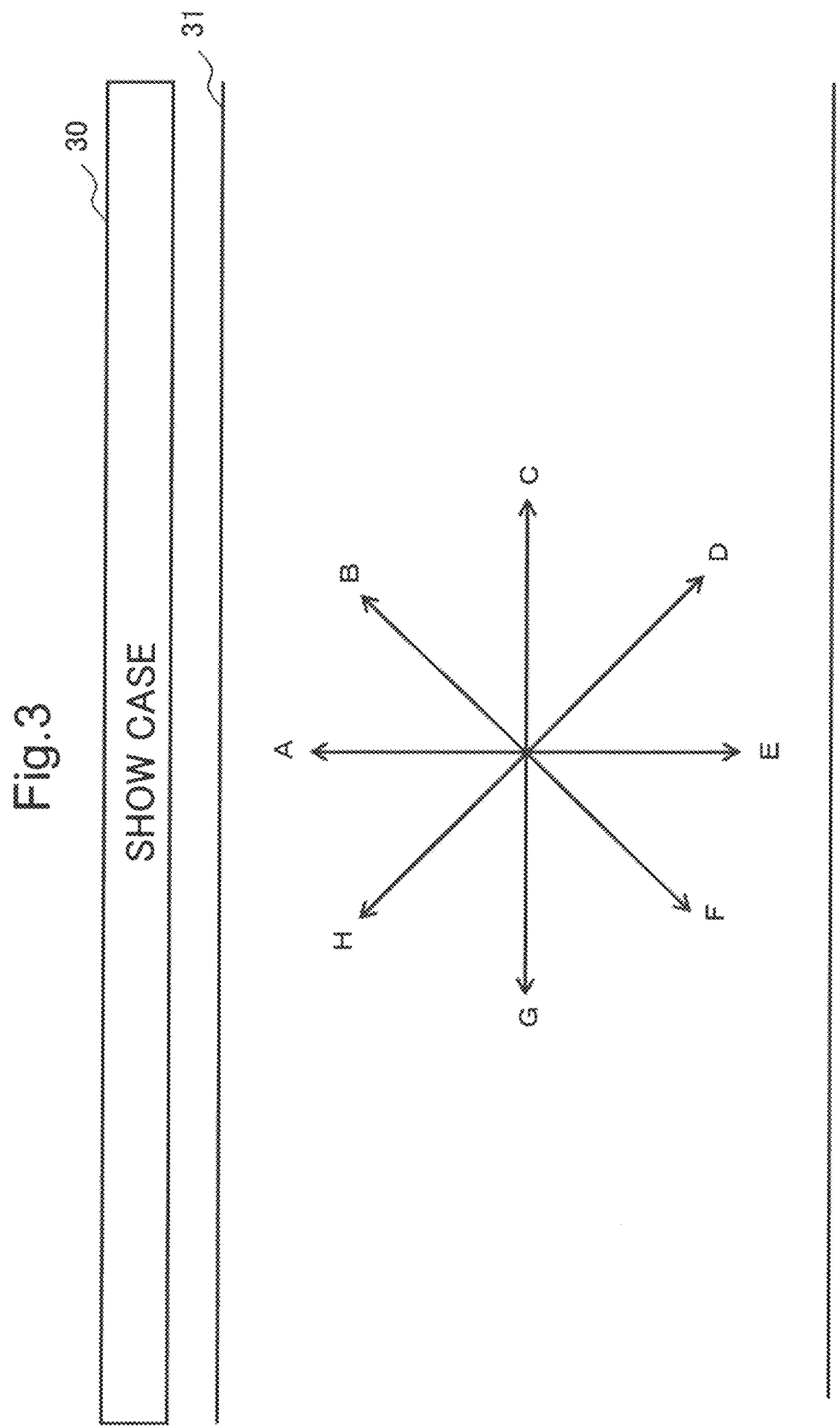
FIG. 3 is diagram illustrative of the corresponding relations between facial orientations and signs (Roman alphabet letters A to H) denoting directions.

FIG. 3 is a top view of show case 30 and aisle 31.

For example, as illustrated in FIG. 3, eight directions are specified in advance in positional relation to show case 30 and are respectively denoted by the Roman alphabet letters A to H. For example, when aisle 31 is in front of show case 30 and a person present in aisle 31 has his/her face orientated toward show case 30 and the face is oriented to show case 30 approximately perpendicularly, the facial orientation is associated with the sign "A". Note that each Roman alphabet letter is associated with a facial orientation with leeway. For example, when the face of the person is oriented in a direction between the directions denoted by the Roman alphabet letters A and B but more inclined to A than B, the facial orientation may be associated with the sign "A".

The method of identifying the facial orientation described above is an example and not only the method described in the present example embodiment but known methods may be used. For example, methods disclosed in JP 2001-291108 A and JP 11-281661 A are known. In JP 2001-291108 A, the facial orientation of an input image is inferred by generating an average face based on the facial data acquired in advance from a plurality of persons facing the front; generating images by mapping the average face to a 3D model and rotating the image at randomly selected angles; and selecting an image having the highest correlation with the input image. In JP 11-281661 A, the region in skin color is extracted from the captured image, the positions of the eyes and the mouth as well as the width of the face are detected from the skin-colored region, and the orientation of a face is inferred from the positional relations among them.

The present example embodiment will be described as to a case where extracted information table 1222 has three entries having the same coordinates (X3, Y3) and the same facial orientations (in the direction "A") corresponding to the coordinates (X3, Y3).

Image-processing unit 121 generates flow line information table 1223 from extracted information table 1222 and stores flow line information table 1223 in storage unit 122. Flow line information table 1223 is constituted by the data in the fields of output position 1223-1, facial orientation 1223-2, and output size 1223-3.

The data in the field of output position 1223-1 indicate coordinates on a flow line to be outputted to display unit 13. In the present example embodiment, the data in the field of output position 1223-1 are basically the same as the data in the field of position 1222-1 but, when there are consecutive entries in extracted information table 1222 that have the same coordinates in position 1222-1 and the same facial orientations corresponding to the coordinates, these consecutive entries are listed in flow line information table 1223 as a single entry.

The data in the field of facial orientation 1223-2 indicate the facial orientations corresponding to the coordinates in the field of output position 1223-1. In the present example embodiment, facial orientations are displayed on display unit 13 using isosceles triangular signs, the detail of which will be described later.

The data in the field of output size 1223-3 indicate the sizes of the triangular signs indicating facial orientations. The sizes of triangular signs indicate time related to facial orientations and the sizes are varied in accordance with the time during which the face of an object was positioned in each orientation, the detail of which will be described later.

Image-processing unit 121 refers to flow line information table 1223 and generates a flow line of the detected person by connecting the coordinates in the field of output position 1223-1 and outputs the generated flow line (flow line information) to display unit 13, together with triangular signs indicating facial orientations (facial orientation information) and time related to the facial orientations (time information). The facial orientation information is an example of orientation information, which indicates an orientation of the object.

A flow line can be generated by using known technology. For example, in JP 2006-35071 A, flow line data are generated by image-processing a video image, detecting a person from the resultant processed image, calculating the coordinates on the plane of the position of the detected person, and connecting the points denoted by the coordinates. Further, when an image containing a plurality of persons is captured, the coordinates of each person's position are calculated. Flow line data are generated by distinguishing the plurality of persons by, for example, appearance, color of clothes on the upper and lower parts of the body, giving each person so distinguished an ID sign, and tracking the persons by similarly processing image data subsequently captured.

Display unit 13 displays facial orientations and time related to the facial orientations together with the flow line of the person. Display unit 13 needs only to be a device with a display and may be, for example, a personal computer or a tablet terminal.

Next, an example output of display unit 13 will be described.

Figure 5:
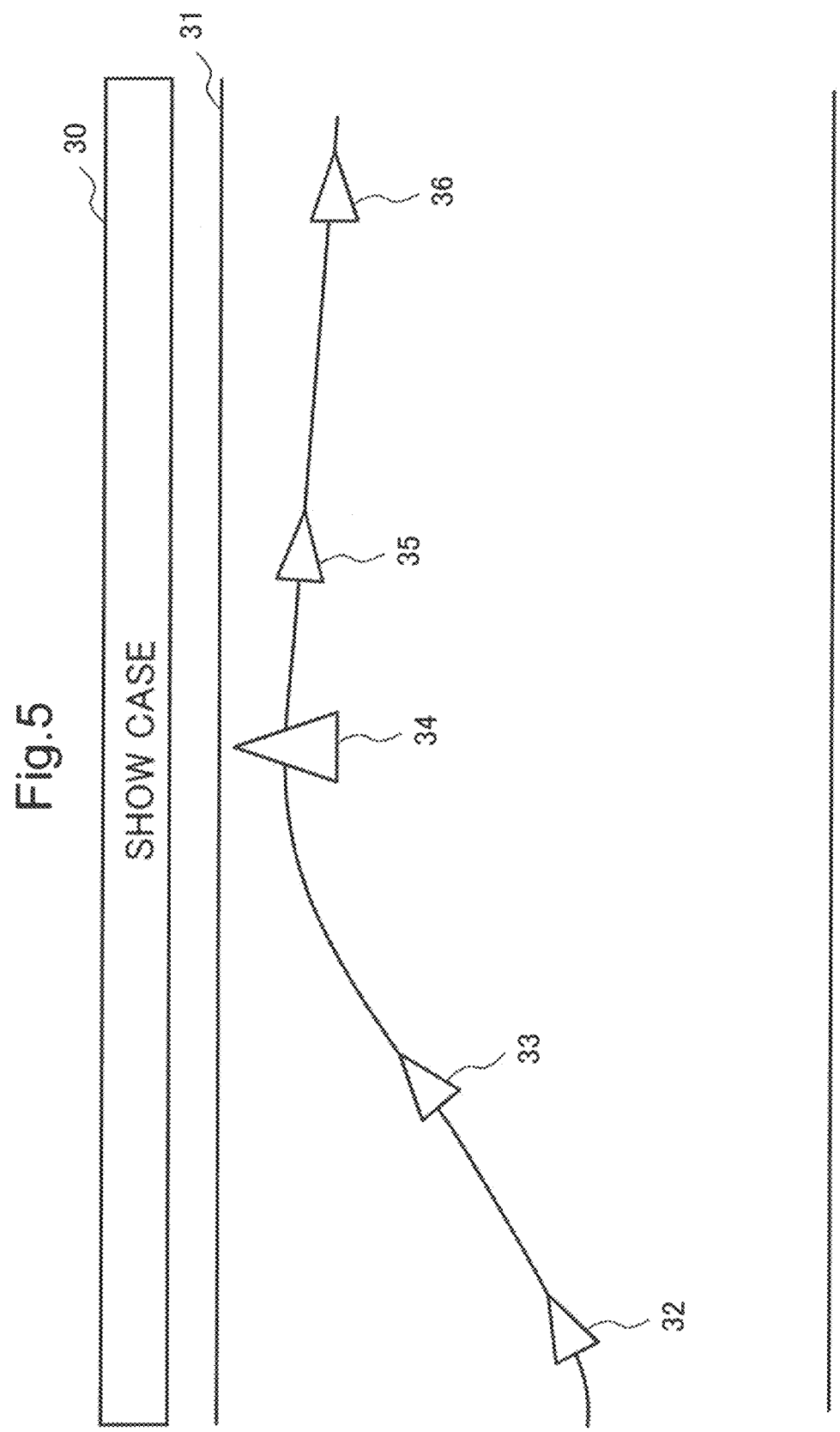
FIG. 5 is a diagram illustrative of an example output of display unit 13.

FIG. 5 illustrates an example in which facial orientations of a person and time related to the facial orientations are displayed together with the flow line.

Facial orientations and time related to the facial orientations are displayed using isosceles triangular signs, the tops of which indicate facial orientations of the person. Further, the sizes of the triangular signs are varied in accordance with the time during which the person had his/her face oriented in each direction, and the longer the person had his/her face oriented in the direction, the larger the size of the triangular sign. FIG. 5 illustrates a display of facial orientations of a person and time related to the facial orientations superimposed on the flow line but the way of display is not restricted thereto and it suffices that the facial orientations of the person and information related to facial orientations are displayed together with the flow line.

Figure 6:
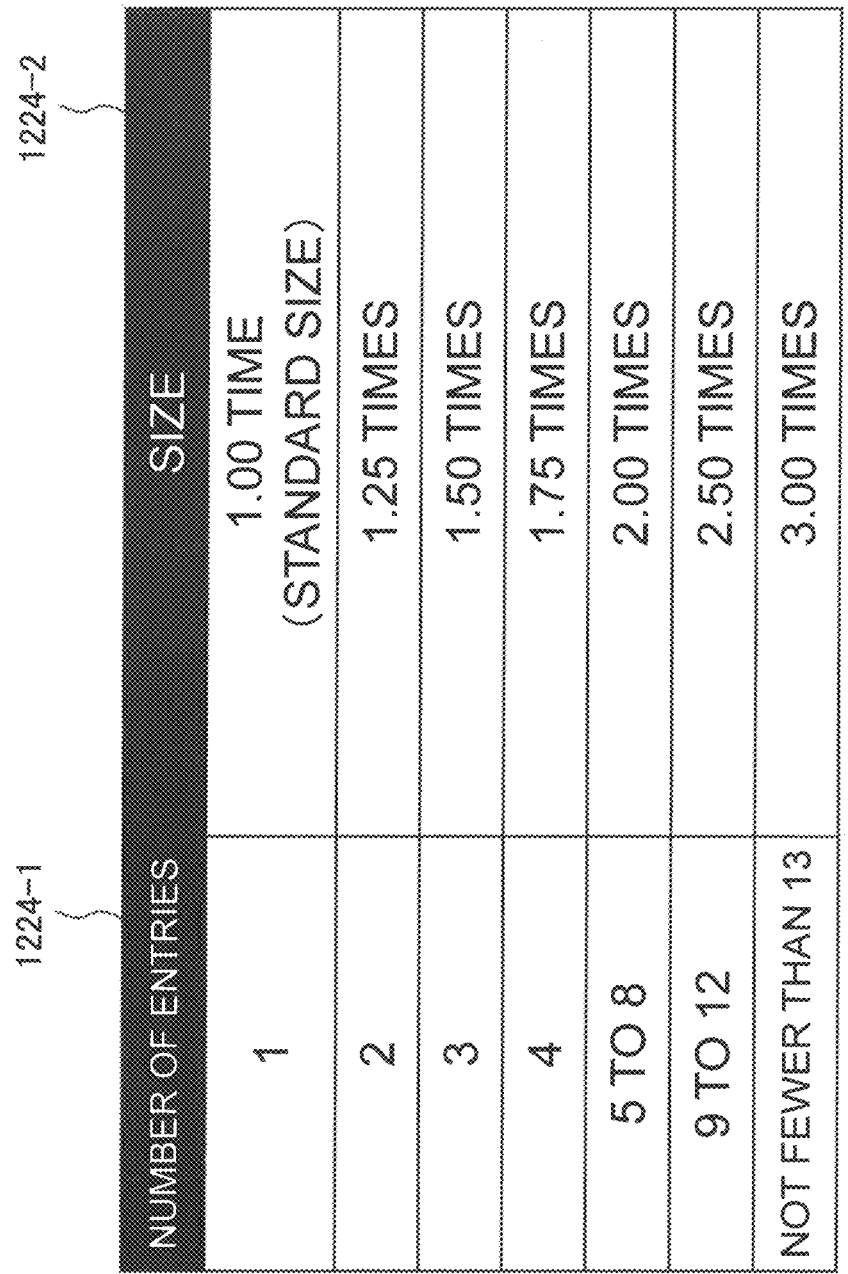
FIG. 6 is a diagram illustrative of size table 1224.

In the present example embodiment, as illustrated in FIG. 6, storage unit 122 stores size table 1224 in advance, which indicates the sizes of the triangular signs. Image-processing unit 121 refers to size table 1224, varies the sizes of the triangular signs and outputs the triangular signs to display unit 13.

Size table 1224 is constituted by the data in the fields of number of entries 1224-1 and size 1224-2.

The data in the field of number of entries 1224-1 indicate numbers of consecutive entries having the same position of the person (same coordinates in the field of position 1222-1) and the same facial orientation (same Roman alphabet letter in the field of facial orientation 1222-3) in the extracted information table 1222 (numbers of consecutive entries). The data in the field of size 1224-2 indicate the sizes in which the triangular signs are displayed in association with numbers of consecutive entries. The size of the triangular sign at a time when the number of consecutive entries is "1" is taken as a standard and referred to as standard size herein.

When the number of consecutive entries is "1", the triangular sign is displayed 1.00 time the standard size, i.e., in the standard size. When the number of consecutive entries is "2", it means a facial orientation in the same direction in a certain position continued for not less than 15 seconds and the triangular sign is displayed in 1.25 times the standard size. When the number of consecutive entries is "3", it means a facial orientation in the same direction in a certain position continued for not less than 30 seconds and the triangular sign is displayed in 1.5 times the standard size. When the number of consecutive entries is "4", it means a facial orientation in the same direction in a certain position continued for not less than 45 seconds and the triangular sign is displayed in 1.75 times the standard size. When the number of consecutive entries is "5 to 8", it means a facial orientation in the same direction in a certain position continued for not less than 1 minute and the triangular sign is displayed in 2.00 times the standard size. When the number of consecutive entries is "9 to 12", it means a facial orientation in the same direction in a certain position continued for not less than 2 minutes and the triangular sign is displayed in 2.50 times the standard size. When the number of consecutive entries is "not fewer than 13", it means a facial orientation in the same direction in a certain position continued for not less than 3 minutes and the triangular sign is displayed in 3.0 times the standard size.

In the present example embodiment, extracted information table 1222 in FIG. 2 contains three consecutive entries all having (X3, Y3) in the field of position 1222-1 and "A" in the field of facial orientation 1222-3; hence the number of consecutive entries corresponding to (X3, Y3) in the field of output position 1223-1 of flow line information table 1223 is "3". Image-processing unit 121 refers to size table 1224 and identifies the display size of the triangular sign corresponding to (X3, Y3) in the field of output position 1223-1 as 1.50 times the standard size.

Since the other coordinates in the field of position 1222-1 are all different from one another, the number of consecutive entries is "1" for all these coordinates in the field of output position 1223-1. Image-processing unit 121 refers to size table 1223 and identifies the display sizes of the corresponding triangular signs as the standard size.

Next, with reference to FIG. 5, the flow line and triangular signs to be displayed by display unit 13 will be described in detail.

The coordinates (X1, Y1) in the field of output position 1223-1 of flow line information table 1223 correspond to triangular sign 32, (X2, Y2) correspond to triangular sign 33, (X3, Y3) correspond to triangular sign 34, (X4, Y4) correspond to triangular sign 35, and (X5, Y5) correspond to triangular sign 36.

With reference to facial orientation 1223-2 of flow line information table 1223, the facial orientation corresponding to (X1, Y1) in the field of output position 1223-1 is "B", and an isosceles triangular sign 32 with its top facing the direction "B" is displayed together with the flow line. Based on the data in the field of output size 1223-3, triangular sign 32 is displayed in the standard size.

The facial orientation corresponding to (X2, Y2) in the field of output position 1223-1 is "B", and an isosceles triangular sign 33 with its top facing the direction "B" is displayed together with the flow line. Based on the data in the field of output size 1223-3, triangular sign 33 is displayed in the standard size.

The facial orientation corresponding to (X3, Y3) in the field of output position 1223-1 is "A", and an isosceles triangular sign 34 with its top facing the direction "A" is displayed together with the flow line. Based on the data in the field of output size 1223-3, triangular sign 34 is displayed 1.50 times the standard size.

The facial orientation corresponding to (X4, Y4) in the field of output position 1223-1 is "C", and an isosceles triangular sign 35 with its top facing the direction "C" is displayed together with the flow line. Based on the data in the field of output size 1223-3, triangular sign 35 is displayed in the standard size.

The facial orientation corresponding to (X5, Y5) in the field of output position 1223-1 is "C", and an isosceles triangular sign 36 with its top facing the direction "C" is displayed together with the flow line. Based on the data in the field of output size 1223-3, triangular sign 36 is displayed in the standard size.

Figure 7:
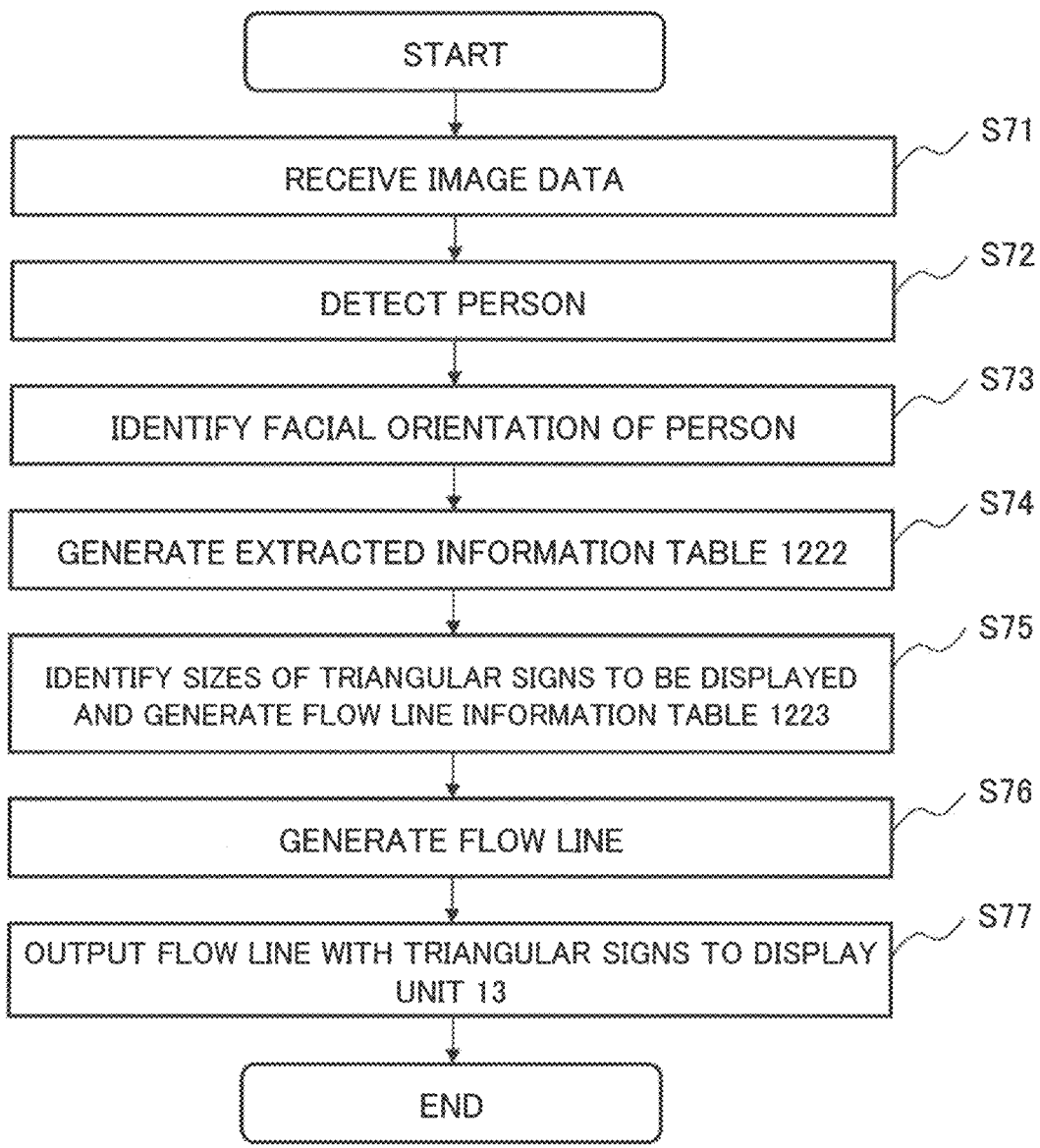
FIG. 7 is a flow chart illustrative of processing by image-processing unit 121.

Next, processing by information-processing device 12 will be described. FIG. 7 is a flow chart illustrative of processing by image-processing unit 121.

First, image-processing unit 121 receives image data from a camera serving as image-capturing unit 11 (step S71) and detects a person from the image data (step S72). Image-processing unit 121 then refers to facial orientation judgment information 1221 stored in advance in storage unit 122 and identifies the facial orientation of the detected person (step S73). Image-processing unit 121 then generates extracted information table 1222 and stores extracted information table 1222 in storage unit 122 (step S74). Image-processing unit 121 then calculates the number of consecutive entries, identifies the sizes of the triangular signs to be displayed with the flow line by referring to size table 1224 stored in advance in the storage unit, and generates flow line information table 1223 (step S75). Image-processing unit 121 then generates a flow line by referring to flow line information table 1223 (step S76) and outputs the flow line with the triangular signs to display unit 13 (step S77).

Image-processing unit 121 may output the flow line to display unit 13 upon request made by a user via display unit 13.

Although facial orientations are indicated by isosceles triangular signs according to the configuration adopted in the present example embodiment, signs are not restricted thereto and any sign that indicates a direction may be used. Signs such as arrows, for example, may be used. Further, for example, the Roman alphabet letters A to H denoting directions as in FIG. 3 may be displayed together with a flow line, wherein the sizes of the Roman alphabet letters are varied in accordance with the time during which the face was oriented in each direction.

FIGS. 8 to 12 illustrate example outputs of display unit 13 in modified examples of the first example embodiment.

Figure 8:
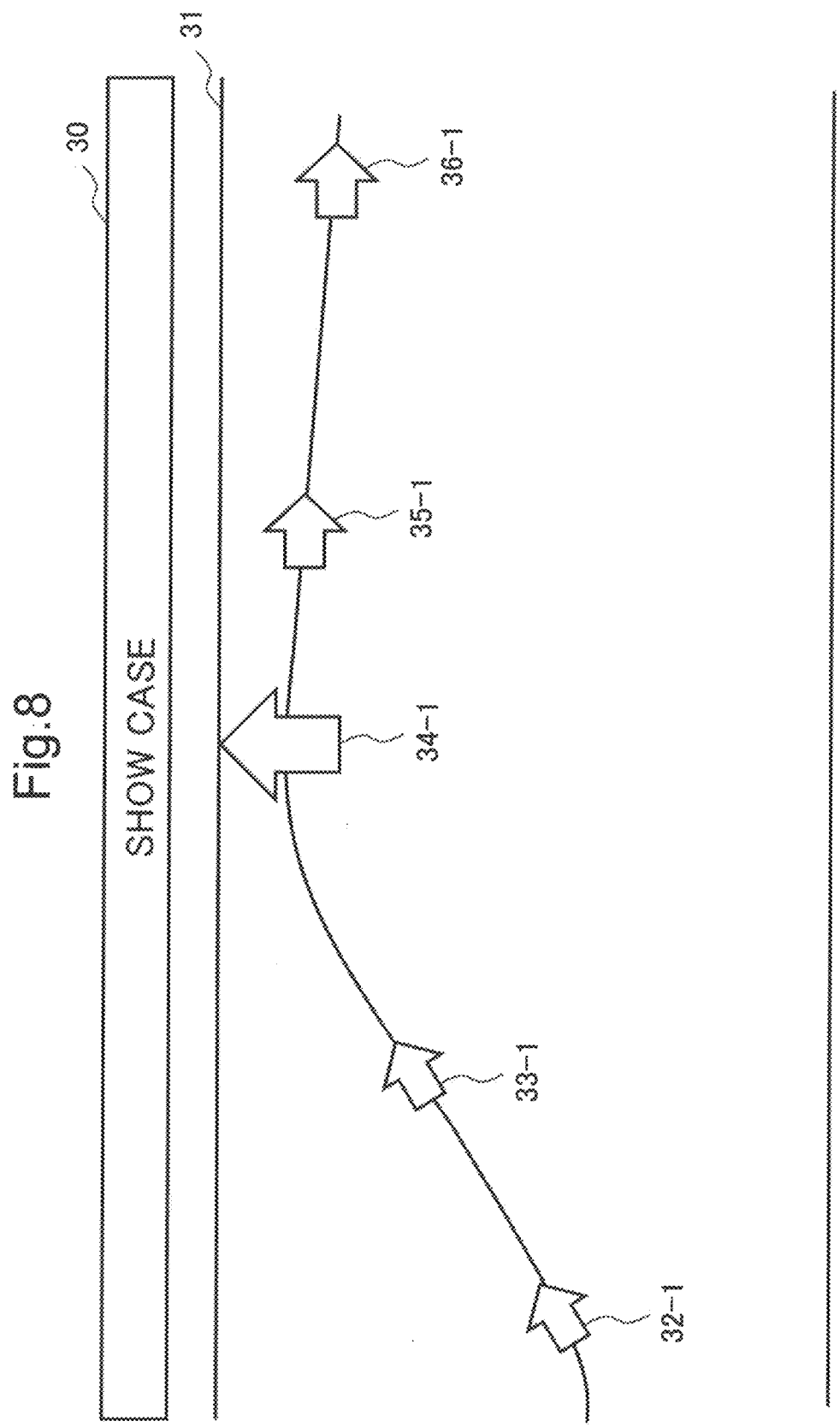
FIG. 8 is a diagram illustrative of an example output of display unit 13 according to a modified example of the first example embodiment.

FIG. 8 illustrates an example output in which arrows are used instead of triangular signs. Arrow 32-1 corresponds to triangular sign 32 of FIG. 5, arrow 33-1 corresponds to triangular sign 33 of FIG. 5, arrow 34-1 corresponds to triangular sign 34 of FIG. 5, arrow 35-1 corresponds to triangular sign 35 of FIG. 5, and arrow 36-1 corresponds to triangular sign 36 of FIG. 5.

Figure 9:
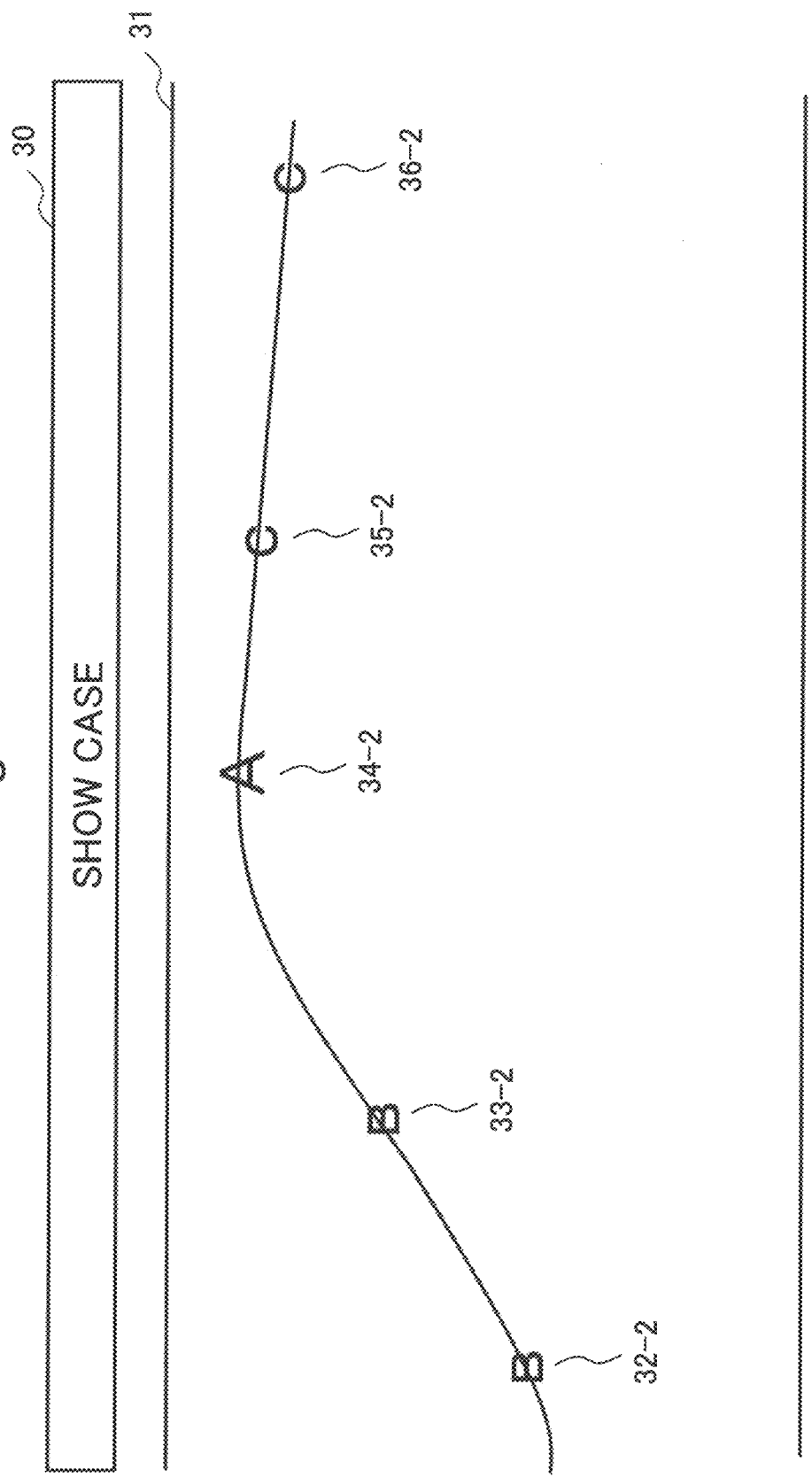
FIG. 9 is a diagram illustrative of an example output of display unit 13 according to a modified example of the first example embodiment.

FIG. 9 illustrates an example output in which Roman alphabet letters denoting directions are used instead of triangular signs. Roman alphabet letter "B" 32-2 corresponds to triangular sign 32 of FIG. 5, Roman alphabet letter "B" 33-2 corresponds to triangular sign 33 of FIG. 5, Roman alphabet letter "A" 34-2 corresponds to triangular sign 34 of FIG. 5, Roman alphabet letter "C" 35-2 corresponds to triangular sign 35 of FIG. 5, and Roman alphabet letter "C" 36-2 corresponds to triangular sign 36 of FIG. 5.

Further, the flow line may be displayed in multiple colors according to facial orientations, and the time related to the facial orientations may be displayed together with the flow line in multiple colors.

Although the present example embodiment has been described as to a case where the facial orientation remains constant at "A" at the position corresponding to (X3, Y3), but there may be a case where the facial orientation of a person is not constant while the person is at a certain position. In such a case, information indicating that the facial orientation is not constant may be displayed together with the flow line or triangular signs indicating a plurality of directions may be displayed together with the flow line. Alternatively, a triangular sign indicating the direction in which the person orientated his/her face for the longest time may be selected and displayed together with the flow line.

Figure 10:
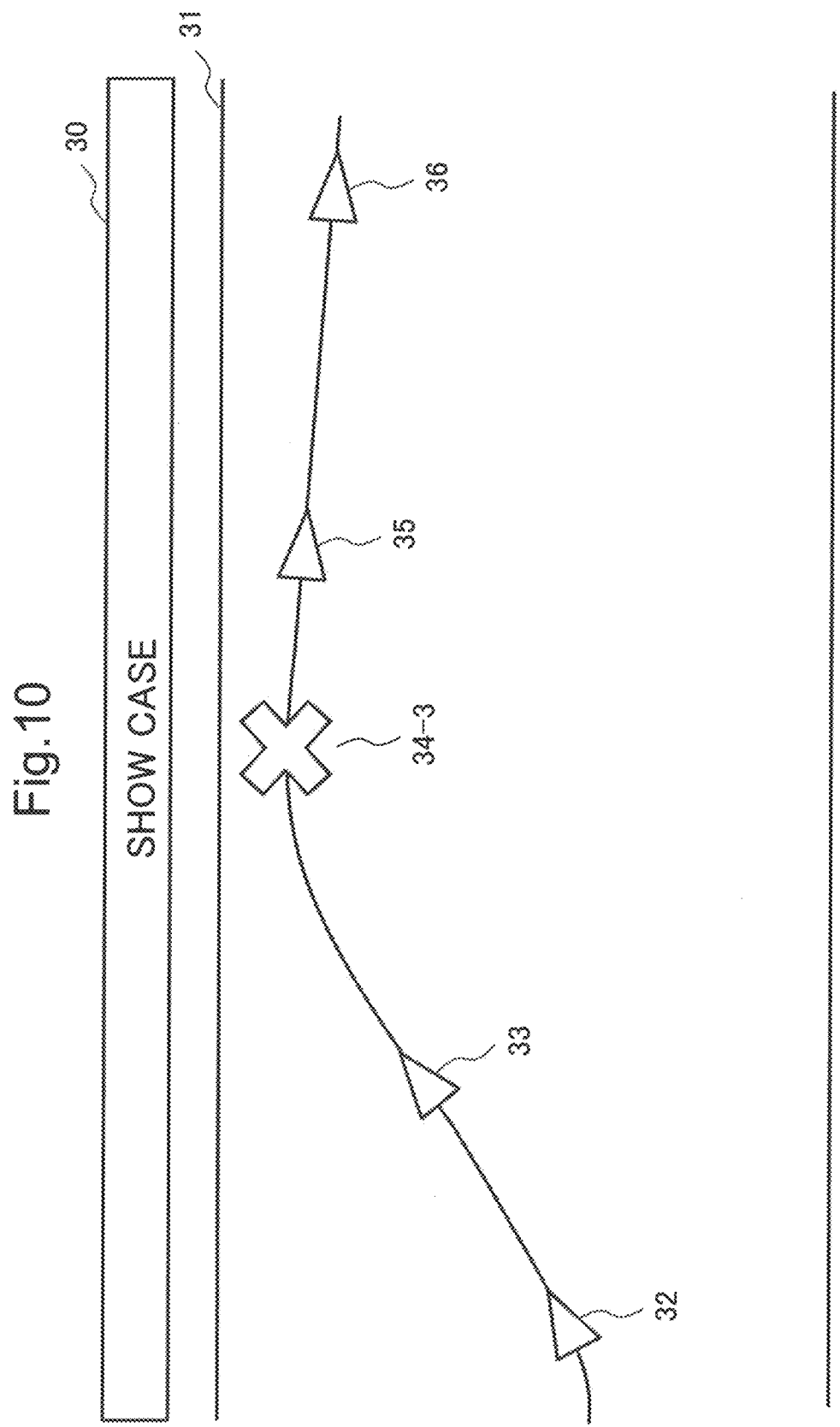
FIG. 10 is a diagram illustrative of an example output of display unit 13 according to a modified example of the first example embodiment.

For example, when three entries having (X3, Y3) in the field of position 1222-1 of extracted information table 1222 have facial orientations different from one another, a cross sign 34-3 indicating that the facial orientation is not constant may be displayed as in FIG. 10, instead of triangular sign 34 of FIG. 5.

Figure 11:
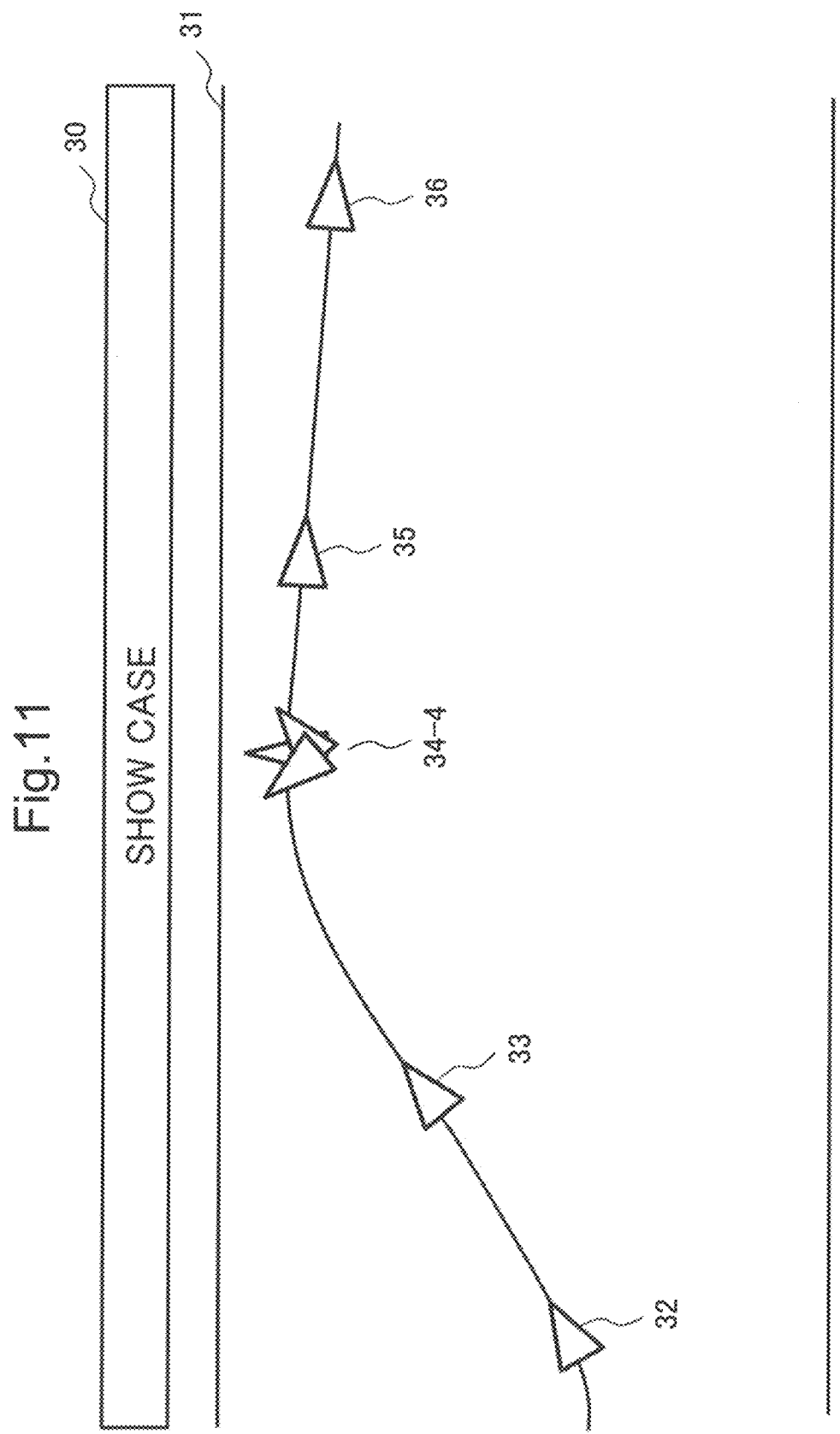
FIG. 11 is a diagram illustrative of an example output of display unit 13 according to a modified example of the first example embodiment.
Figure 12:
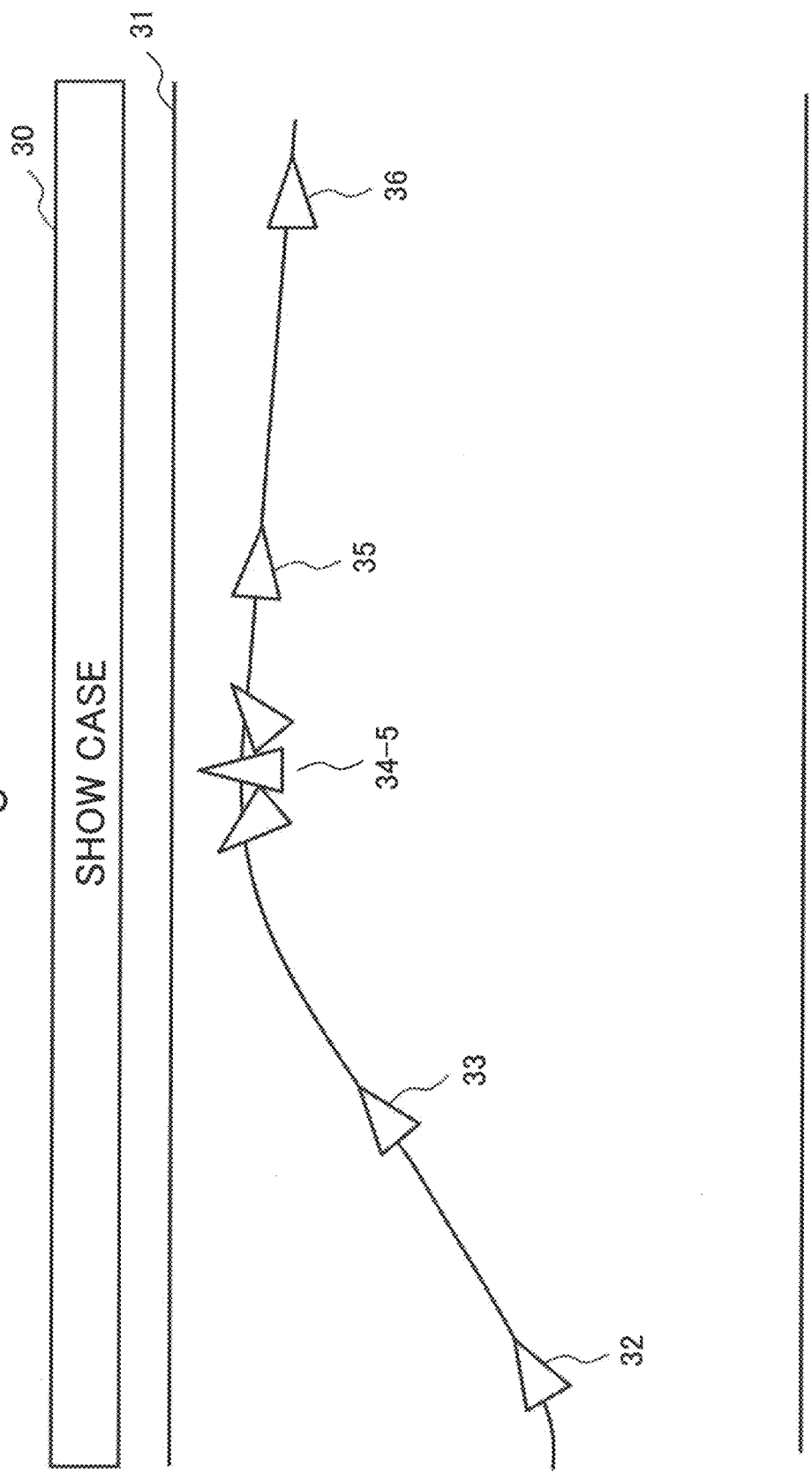
FIG. 12 is a diagram illustrative of an example output of display unit 13 according to a modified example of the first example embodiment.
Figure 13:
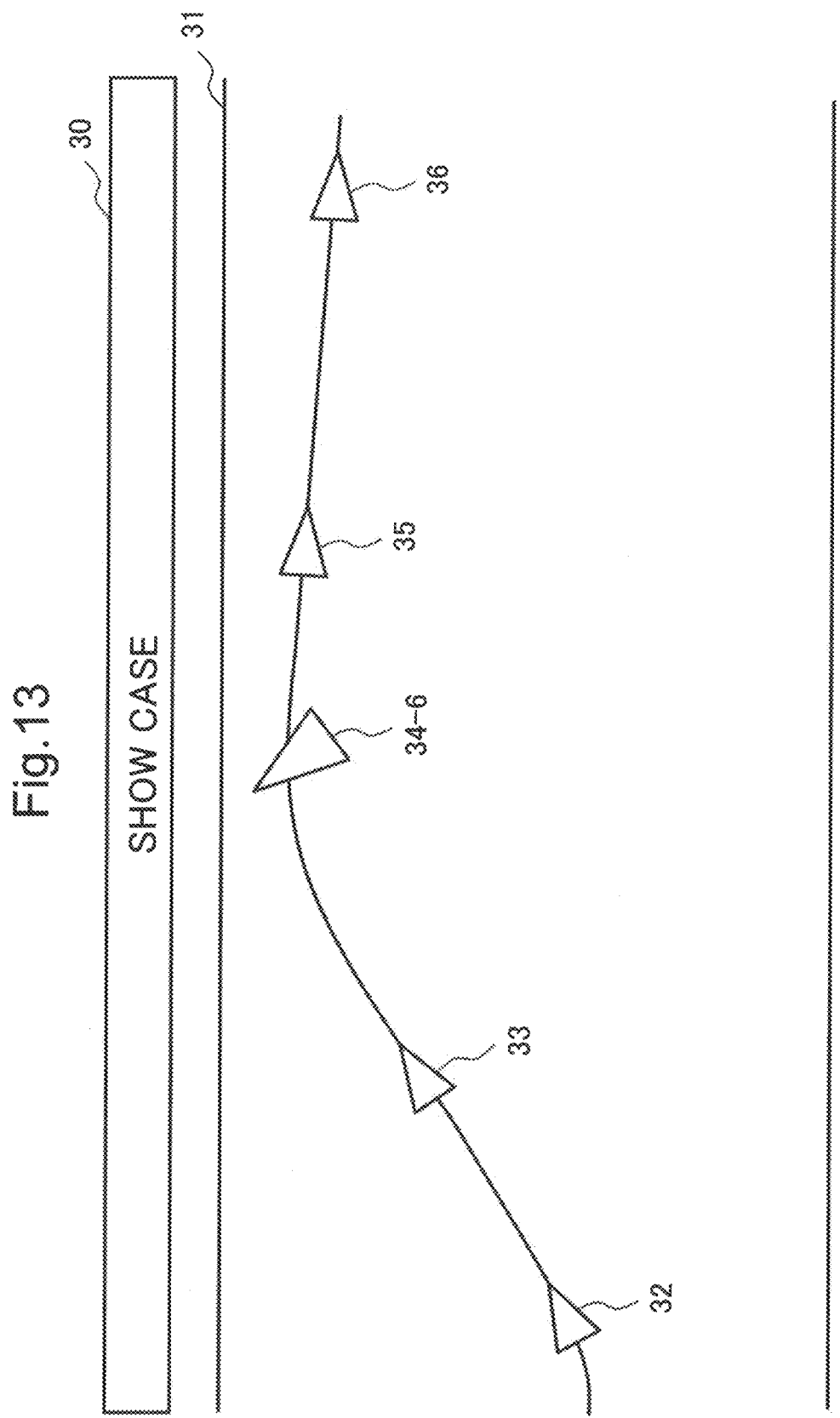
FIG. 13 is a diagram illustrative of an example output of display unit 13 according to a modified example of the first example embodiment.

For example, when three entries having (X3, Y3) in the field of position 1222-1 of extracted information table 1222 respectively have facial orientations "H", "B", and "A" in a time series, triangular signs 34-4 indicating the three directions "H", "B", and "A" may be superimposed and displayed as in FIG. 11. Alternatively, triangular signs 34-5 indicating the three directions "H", "B", and "A" may be juxtaposed and displayed from the left to the right as in FIG. 12. For example, when three entries having (X3, Y3) in the field of position 1222-1 of extracted information table 1222 respectively have facial orientations "H", "H", and "A" in a time series, only a triangular sign 34-6 indicating the direction denoted by "H" in which the person orientated his/her face for the longest time may be displayed as in FIG. 13. In this case, as the corresponding number of consecutive entries is "2", the triangular sign 34-6 is displayed in 1.25 times the standard size.

Further, image-processing unit 121 may be configured to determine whether or not to display the facial orientations and the time related to the facial orientations together with the flow line, in a manner depending on the position of the person present in aisle 31 in front of show case 30. For example, display unit 13 may display the facial orientations and the time related to the facial orientations together with the flow line only when the distance between the person and show case 30 is not greater than a predetermined value. Further, display unit 13 may display the facial orientations and the time related to the facial orientations together with the flow line only when the distance between the person and show case 30 is not greater than a predetermined value and the facial orientation of the person is presumed to be in the direction of show case 30.

As described above, the present example embodiment allows the collection of more accurate marketing information by displaying the orientation of an object such as a person and the time related to the orientation together with the flow line.

Next, a second example embodiment of the present invention will be described.

In the first example embodiment, the sizes of the triangular signs are varied in accordance with the time during which the person had his/her face oriented in each direction. The second example embodiment differs in that the colors of the triangular signs are varied in accordance with the time during which the person had his/her face oriented in each direction. The other features are similar to those in the first example embodiment and will not be described in further detail.

Figure 14:
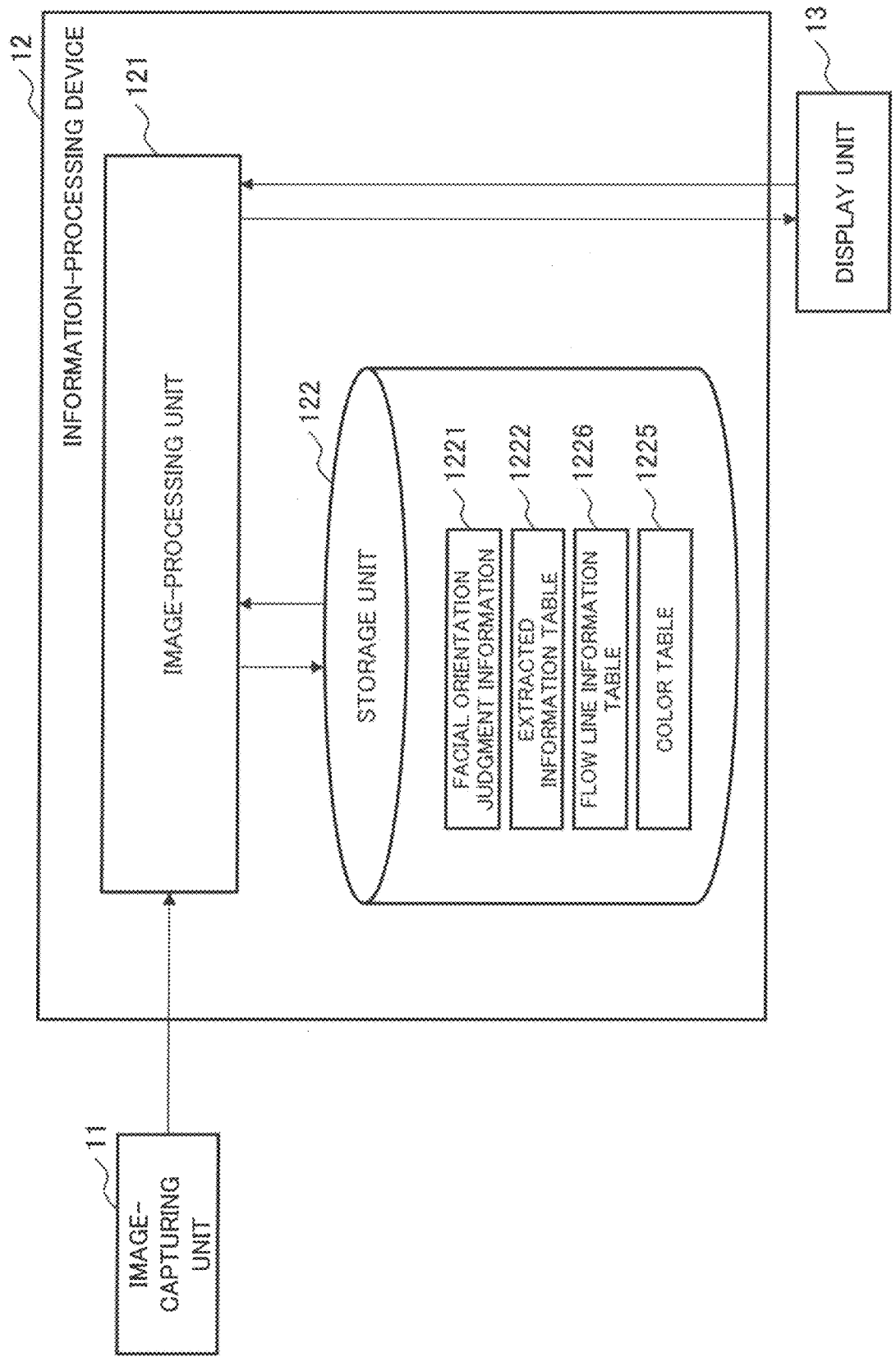
FIG. 14 is a block diagram illustrative of flow line display system 14 according to a second example embodiment.

FIG. 14 illustrates a block diagram of flow line display system 14 according to the present example embodiment.

In flow line display system 14, color table 1225 instead of size table 1224 is stored in storage unit 122.

FIG. 15 illustrates color table 1225. Color table 1225 is constituted by the data in the fields of number of entries 1225-1 and color 1225-2. The data in the field of number of entries 1225-1 indicate numbers of consecutive entries. The data in the field of color 1225-2 indicate colors of the flow line associated with the numbers of consecutive entries.

When the number of consecutive entries is "1", the triangular sign is displayed in black. When the number of consecutive entries is "2", the triangular sign is displayed in gray. When the number of consecutive entries is "3", the triangular sign is displayed in blue. When the number of consecutive entries is "4", the triangular sign is displayed in yellow. When the number of consecutive entries is "5 to 8", the triangular sign is displayed in green. When the number of consecutive entries is "9 to 12", the triangular sign is displayed in orange. When the number of consecutive entries is "not fewer than 13", the triangular sign is displayed in red.

Image-processing unit 121 refers to extracted information table 1222 and color table 1225, generates flow line information table 1226, and stores flow line information table 1226 in storage unit 122.

FIG. 16 illustrates flow line information table 1226 according to the present example embodiment.

Flow line information table 1226 is constituted by the data in the fields of output position 1226-1, facial orientation 1226-2, and color 1226-3. The data in the fields of output position 1226-1 and facial orientation 1226-2 are similar to those in the fields of output position 1223-1 and facial orientation 1223-2 of flow line information table 1223 in the first example embodiment. Output size 1223-3 of flow line information table 1223 is replaced by color 1226-3 in the present example embodiment, and "1.0 time" in the field of output size 1223-3 corresponds to "black" in the field of color 1226-3 and "1.5 times" in the field of output size 1223-3 corresponds to "blue" in the field of color 1226-3.

FIG. 17 illustrates an example output of display unit 13. Triangular signs 32 to 36 are all in the same size but in different colors in accordance with the time during which the person had his/her face oriented in each direction. In the present example embodiment, triangular signs 32, 33, 35, and 36 are displayed in black and triangular sign 34 is displayed in blue.

FIG. 18 illustrates processing by image-processing unit 121 in the present example embodiment.

In the first example embodiment, the sizes of the triangular signs to be displayed are identified in step S75. In the present example embodiment, the colors of the triangular signs are identified based on color table 1225 (step S1805). The other steps are similar and will not be described in further detail.

The present example embodiment, similarly to the first example embodiment, allows the collection of more accurate marketing information by displaying the orientation of an object such as a person and the time related to the orientation together with the flow line.

Next, a third example embodiment will be described.

In the first and the second example embodiments, for example, when the facial orientation is "A", it is revealed that the person was looking at show case 30 but it is not revealed how high a level of show case 30 the person was looking at. The present example embodiment differs in that, when the person is presumed to be looking at show case 30, line-of-sight information indicating heights of the line of sight of the person is displayed together with the flow line in addition to the facial orientations and time related to the facial orientations.

Image-processing unit 121 detects the line of sight of the detected person from the image data received from image-capturing unit 11 and identifies the height of the line of sight of the person.

The present example embodiment will be described as to a case where image-processing unit 121 judges that the person is looking at show case 30 when the facial orientation is "A", but the way of making such a judgement is not restricted thereto. For example, image-processing unit 121 may judge that the person is looking at show case 30 when the facial orientation is any one of "A", "B", and "H".

Further, for example, the line of sight of the person may be identified at all positions at which the person was detected, regardless of facial orientation. Further, the line-of-sight information may be displayed only when the distance between show case 30 and the person is not greater than a predetermined value. Further, the line-of-sight information may be displayed only when the distance between show case 30 and the person is not greater than a predetermined value and the facial orientation of the person is presumed to be in the direction of show case 30.

Figure 19:
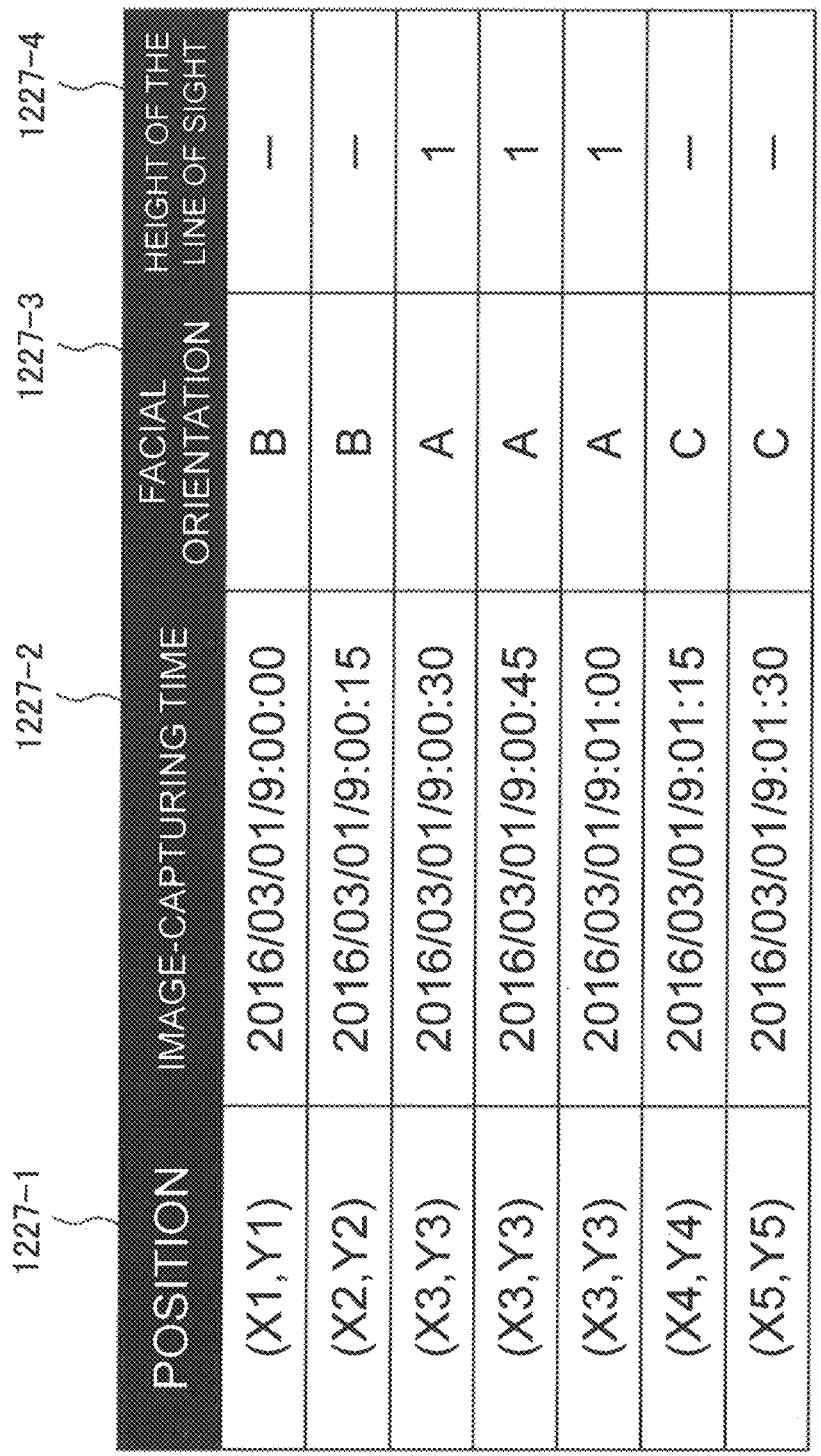
FIG. 19 is a diagram illustrative of extracted information table 1227 according to a third example embodiment.

FIG. 19 illustrates extracted information table 1227 according to the present example embodiment.

Compared with extracted information table 1222 according to the first example embodiment, extracted information table 1227 additionally includes data in the field of height of the line of sight 1227-4 but the other elements are the same.

The present example embodiment will be described as to a case where show case 30 includes three shelves. When the person directs his/her line of sight to the height of the upper shelf of show case 30, "1" is given as a value in the field of height of the line of sight 1227-4. When the person directs his/her line of sight to the height of the middle shelf of show case 30, "2" is given as a value in the field of height of the line of sight 1227-4. When the person directs his/her line of sight to the height of the lower shelf of show case 30, "3" is given as a value in the field of height of the line of sight 1227-4.

Though not illustrated, storage unit 122 stores in advance a table that indicates the association between the heights of the line of sight of the person and the values in the field of height of the line of sight 1227-4 of extracted information table 1227.

Image-processing unit 121 refers to extracted information table 1227, generates flow line information table 1228, and stores flow line information table 1228 in storage unit 122.

Figure 20:
FIG. 20 is a diagram illustrative of flow line information table 1228.

FIG. 20 illustrates flow line information table 1228.

Flow line information table 1228 is constituted by the data in the fields of output position 1228-1, facial orientation 1228-2, output size 1228-3, and height of the line of sight 1228-4. The data in the fields of output position 1228-1, facial orientation 1228-2, and output size 1228-3 are similar to those in the fields of output position 1223-1, facial orientation 1223-2, and output size 1223-3 of flow line information table 1223 in the first example embodiment. The data in the field of height of the line of sight 1228-4 indicate the heights of the line of sight of an object corresponding to the coordinates in the field of output position 1228-1.

In the present example embodiment, the data in the field of position 1227-1 of extracted information table 1227 are basically the same as the data in the field of output position 1228-1 of flow line information table 1228 but, when there are consecutive entries having the same coordinates for position 1227-1 of extracted information table 1227 and the same facial orientations and the same heights of the line of sight corresponding to the coordinates, these consecutive entries are listed in flow line information table 1228 as a single entry.

Figure 21:
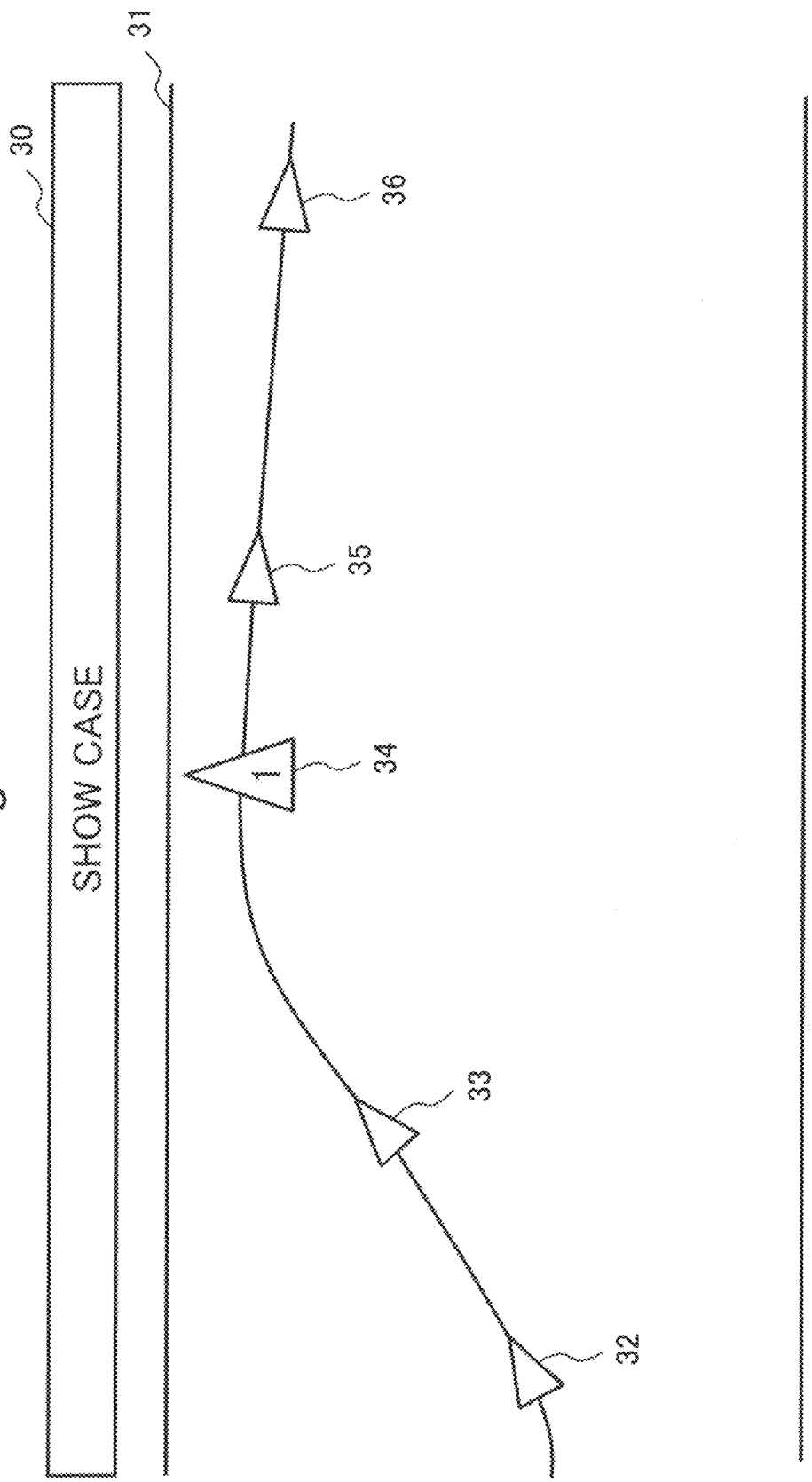
FIG. 21 is a diagram illustrative of an example output of display unit 13.

FIG. 21 illustrates an example output of display unit 13 according to the present example embodiment.

In FIG. 21, the value "1" in the field of height of the line of sight 1228-4 is superimposed on triangular sign 34 and displayed. FIG. 21 is otherwise similar to FIG. 5 illustrative of an example output according to the first example embodiment and will not be described in further detail.

Figure 22:
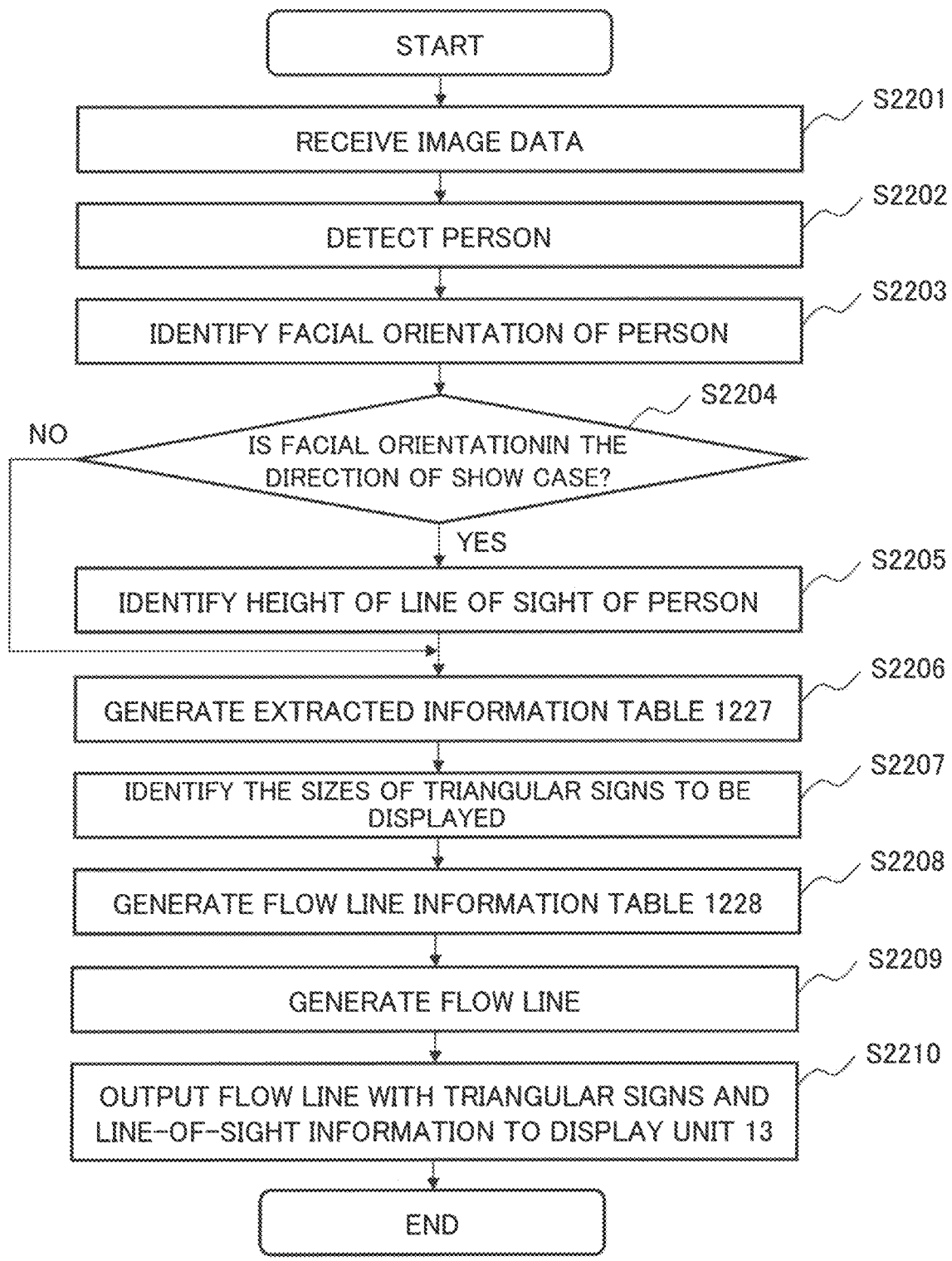
FIG. 22 is a flow chart illustrative of processing by image-processing unit 121.

Next, processing by information-processing device 12 will be described. FIG. 22 is a flow chart illustrative of processing by image-processing unit 121.

First, image-processing unit 121 receives image data from a camera serving as image-capturing unit 11 (step S2201) and detects a person from the image data (step S2202). Image-processing unit 121 then refers to facial orientation judgment information 1221 stored in advance in storage unit 122 and identifies the facial orientation of the detected person (step S2203). Image-processing unit 121 then determines whether or not the facial orientation of the person is in the direction of show case 30 (step S2204). More specifically, image-processing unit 121 determines whether or not the data in the field of facial orientation 1227-3 is "A". When the facial orientation of the person is in the direction of show case 30, image-processing unit 121 identifies the height of the line of sight of the person (step S2205). Image-processing unit 121 then generates extracted information table 1227 and stores extracted information table 1227 in storage unit 122 (step S2206). When the facial orientation of the person is not in the direction of show case 30, image-processing unit 121 generates extracted information table 1227 without identifying the height of the line of sight of the person and stores extracted information table 1227 in storage unit 122 (step S2206). Image-processing unit 121 then calculates the number of consecutive entries, identifies the sizes of the triangular signs to be displayed with a flow line by referring to size table 1223 stored in advance in the storage unit (step S2207). Image-processing unit 121 then generates flow line information table 1228 and stores flow line information table 1228 in storage unit 122 (step S2208). Image-processing unit 121 then generates a flow line by referring to flow line information table 1228 (step S2209) and outputs the flow line with the triangular signs and the line-of-sight information to display unit 13 (step S2210).

In the present example embodiment, all the entries having (X3, Y3) in the field of position 1227-4 of extracted information table 1227 have the value "1" in the field of height of the line of sight 1227-1. When the person directed his/her line of sight to a plurality of directions (e.g., the three entries having (X3, Y3) in the field of position 1227-1 have different values for the height of the line of sight), information indicating that the height of the line of sight is not identified may be displayed. Further, when the person directed his/her line of sight to a plurality of directions, some of the most frequent values in the field of height of the line of sight 1227-4 may be displayed or the average of the values in the field of height of the line of sight 1227-4 may be displayed.

Figure 23:
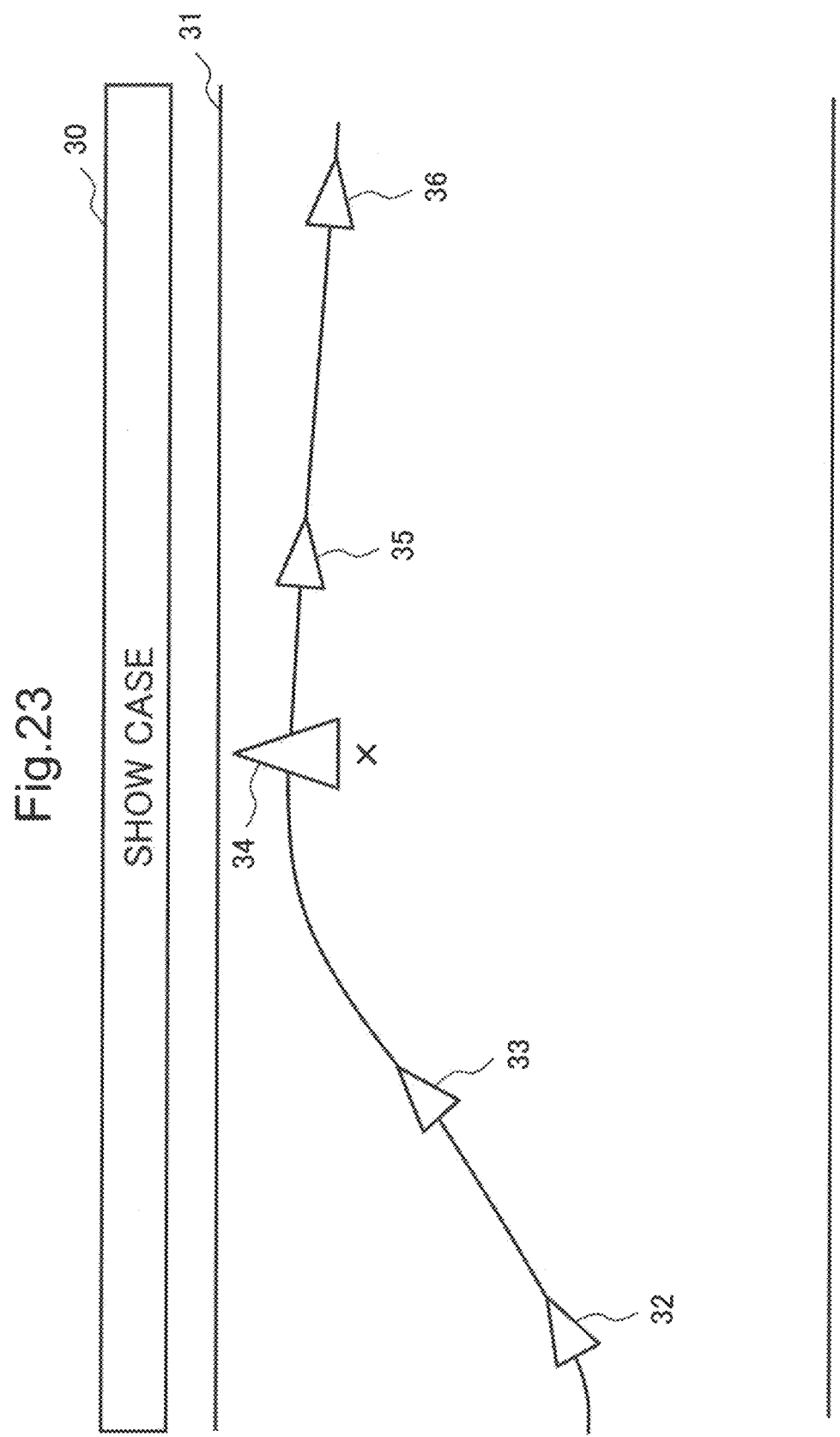
FIG. 23 is a diagram illustrative of an example output of display unit 13 according to a modified example of the third example embodiment.
Figure 24:
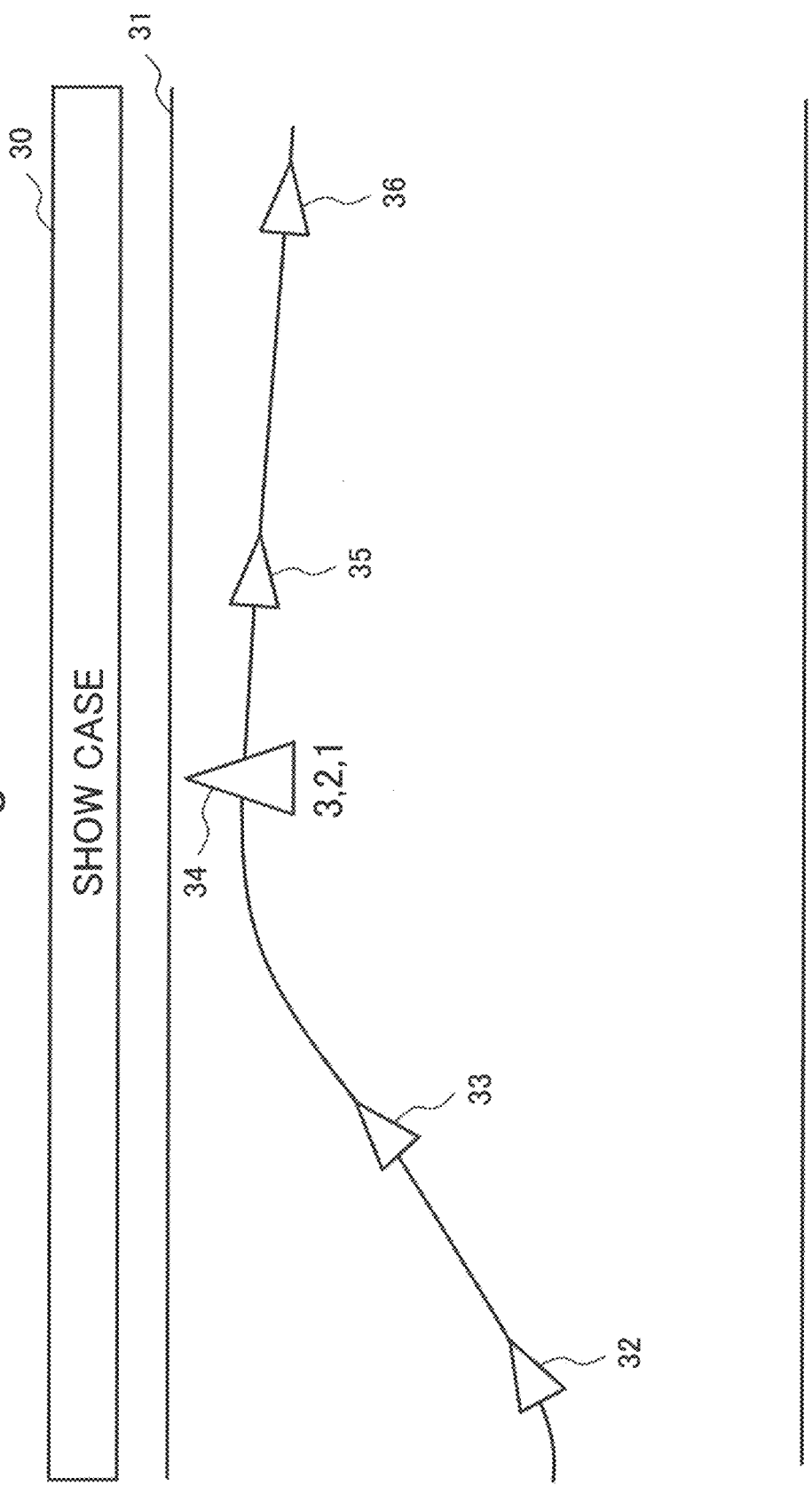
FIG. 24 is a diagram illustrative of an example output of display unit 13 according to a modified example of the third example embodiment.

FIGS. 23 and 24 illustrate example outputs of display unit 13 according to modified examples of the third example embodiment.

For example, when three entries having (X3, Y3) in extracted information table 1227 respectively have different values "3", "2", and "1" in a time series in the field of height of the line of sight 1227-3, a cross sign indicating that the line of sight is not constant may be displayed together with the triangular sign as in FIG. 23 or numerals indicating the heights of the line of sight may be arranged from the left in a time series and displayed as in FIG. 24.

The present example embodiment allows the collection of more accurate marketing information by displaying line-of-sight information indicating the line of sight of the person, in addition to the orientation of an object and the time related to the orientation, together with the flow line.

Next, a fourth example embodiment will be described.

In the first and the second example embodiments, facial orientations and time related to the facial orientations are added to the flow line and displayed. The present example embodiment differs in that information on the walking speed of the detected person is also added and displayed.

Figure 25:
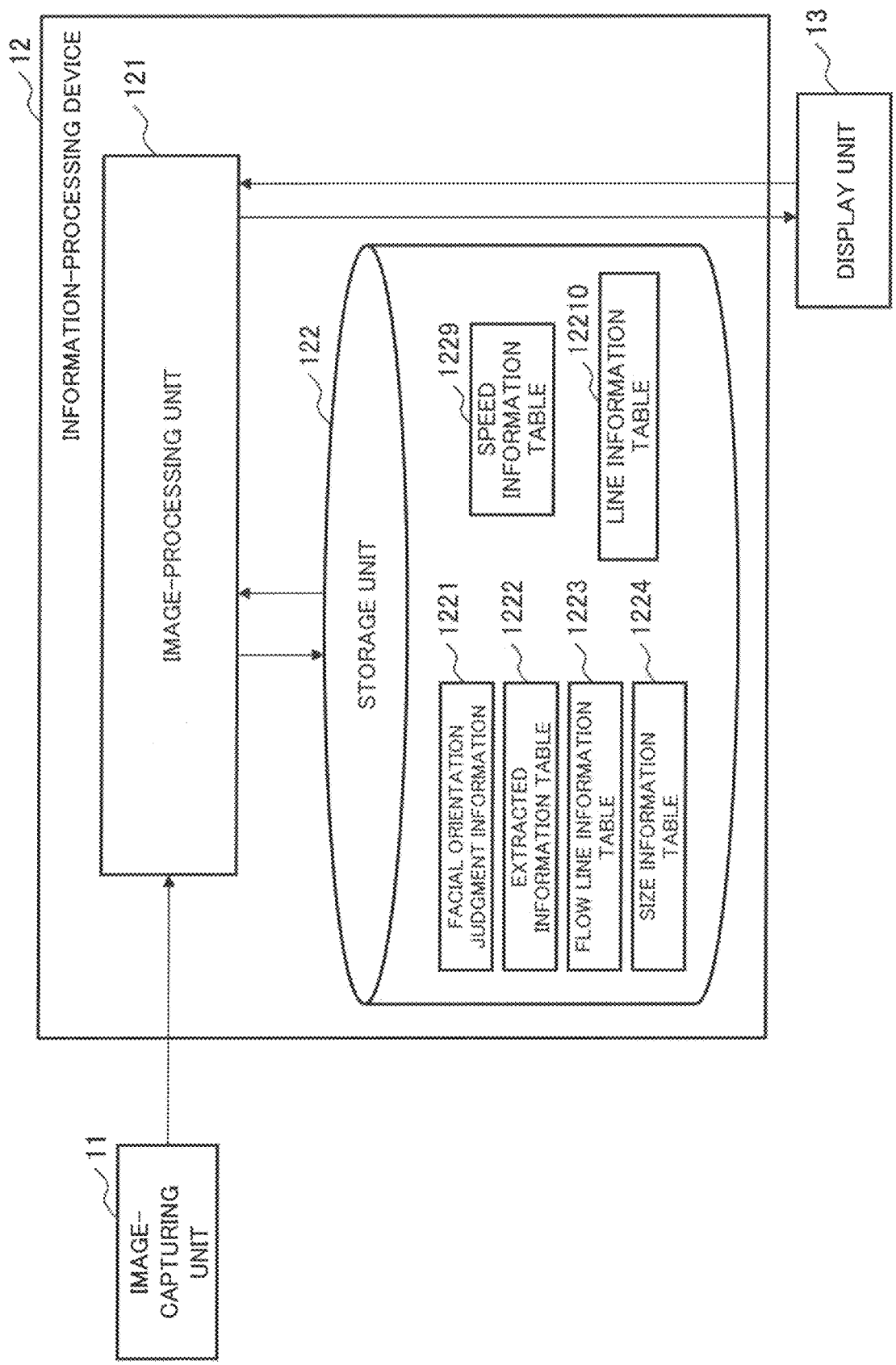
FIG. 25 is a block diagram illustrative of flow line display system 25 according to a fourth example embodiment.

FIG. 25 illustrates a block diagram of flow line display system 25 according to the present example embodiment.

Image-processing unit 121 generates speed information table 1229 by referring to extracted information table 1222 and stores speed information table 1229 in storage unit 122. Storage unit 122 stores line information table 12210 in advance.

FIG. 26 illustrates speed information table 1229. Speed information table 1229 is constituted by the data in the fields of section 1229-1 and speed 1229-2.

Let the first section be the section from (X1, Y1) to (X2, Y2), the second section be the section from (X2, Y2) to (X3, Y3), the third section be the section from (X3, Y3) to (X4, Y4), and the fourth section be the section from (X4, Y4) to (X5, Y5).

Image-processing unit 121 calculates the walking speed in each section and stores the walking speed in speed information table 1229.

In the present example embodiment, the walking speed is 0.6 m/s in the first section and the second section, 1.2 m/s in the third section, and 1.6 m/s in the fourth section, as illustrated in speed information table 1229 in FIG. 26.

FIG. 27 illustrates line information table 12210.

Line information table 12210 is constituted by the data in the fields of speed 12210-1 and line 12210-2. Line information table 12210 indicates that the section in which the walking speed is less than 0.8 m/s is to be displayed in continuous line, that the section in which the walking speed is not less than 0.8 m/s and less than 1.6 m/s is to be displayed in dashed line, and that the section in which the walking speed is not less than 1.6 m/s is to be displayed in dotted line. The types of lines to be displayed are not restricted thereto and may be, such as, bold line, double line.

FIG. 28 illustrates an example output of display unit 13 according to the present example embodiment.

The section from triangular sign 32 to triangular sign 33 corresponds to the first section and is displayed in continuous line because the walking speed is 0.6 m/s. The section from triangular sign 33 to triangular sign 34 corresponds to the second section and is displayed in continuous line because the walking speed is 0.6 m/s. The section from triangular sign 34 to triangular sign 35 corresponds to the third section and is displayed in dashed line because the walking speed is 1.2 m/s. The section from triangular sign 35 to triangular sign 36 corresponds to the fourth section and is displayed in dotted line because the walking speed is 1.6 m/s.

Next, processing by information-processing device 12 according to the present example embodiment will be described. FIG. 29 is a flow chart illustrative of processing by image-processing unit 121.

First, image-processing unit 121 receives image data from a camera serving as image-capturing unit 11 (step S2901) and detects a person from the image data (step S2902). Image-processing unit 121 then refers to facial orientation judgment information 1221 stored in advance in storage unit 122 and identifies the facial orientations of the detected person (step S2903). Image-processing unit 121 then generates extracted information table 1222 and stores extracted information table 1222 in storage unit 122 (step S2904). Image-processing unit 121 then calculates the number of consecutive entries and identifies the sizes of the triangular signs to be displayed with flow line information by referring to size table 1223 stored in advance in storage unit 122 (step S2905). Image-processing unit 121 then calculates the walking speed of the person in each section (step S2906), generates speed information table 1229 and stores speed information table 1229 in storage unit 122 (step S2907).

Image-processing unit 121 then refers to line information table 12210, identifies the type of flow line in each section (step S2908), and generates the flow line of the type identified in step S2908 (step S2909). Image-processing unit 121 then outputs the flow line together with triangular signs to display unit 13 (step S2910).

The present example embodiment allows the collection of more accurate marketing information by displaying the flow line together with information on the walking speed of the person in addition to the orientation of an object and the time related to the orientation.

Next, a fifth example embodiment will be described.

The present example embodiment differs from the first example embodiment in that the information used in the first to fourth example embodiment is stored in storage unit 122 and that display unit 13 makes different outputs in accordance with the requests by a user. The other features are similar to those in the first example embodiment and will not be described in further detail.

In the present example embodiment, storage unit 122 includes all the tables stored according to the first to fourth example embodiment. Upon an instruction by the user communicated via display unit 13 about a mode of display on display unit 13, image-processing unit 121 refers to storage unit 122, generates information on the flow line in accordance with the request by the user, and outputs the information to display unit 13. For example, upon receiving a request from output unit 13 for displaying facial orientations using triangular signs and varying the sizes of the triangular signs in accordance with the time during which the face was positioned in each facial orientation, image-processing unit 121 outputs information as illustrated in FIG. 5 in the first example embodiment to display unit 13.

In the present example embodiment, a user can collect more appropriate marketing information as the output information is altered in accordance with the request by the user.

Note that, while facial orientations and time related to the facial orientations are displayed in addition to the flow line in the first and the second example embodiments, the flow line may be displayed in multiple colors according to the facial orientations, without displaying the time related to the facial orientations. For example, a table in which the facial orientations are associated with information on the colors of the flow line is stored in advance in storage unit 122, and flow line is displayed in multiple colors according to the facial orientations by referring to the table of association (the table of association between the facial orientations and color information of the flow line).

Alternatively, the flow line may be displayed in different types of lines according to the walking speeds of the person, without displaying facial orientations and the time related to the facial orientations. Further, the flow line may be displayed in different types of lines according to the walking speeds of the person, with only the facial orientations added to the flow line. Further, the flow line may be displayed with only the facial orientations and line-of-sight information indicating the height of the line of sight added to the flow line, without displaying the time related to the facial orientations.

The present invention has been described above by taking the above-described example embodiments as exemplary examples. However, the present invention is not restricted to the above-described example embodiments. In other words, various aspects that a person skilled in the art can understand can be applied to the present invention within the scope of the present invention.

[Supplementary Note]

The above-described example embodiments can be described wholly or partly as in the following Supplementary Note but are not restricted thereto.

(Supplementary Note 1)
A flow line display system comprising:
image-capturing unit that captures an image;
an information operation device that detects an object from the image and identifies a flow line of the object, an orientation of the object, and a time related to the orientation; and
display unit that displays the orientation of the object and the time related to the orientation together with the flow line of the object.

(Supplementary Note 2)
The flow line display system according to Supplementary Note 1,
wherein the information-processing device comprises
image-processing unit that detects an object from the image and identifies a position of the object, a time of capturing the image, and an orientation of the object, and
storage unit that stores position information indicating the position of the object, image-capturing time information indicating the time of capturing the image, and orientation information indicating the orientation of the object in association with one another, and
wherein the image-processing unit identifies flow line information of the object and time information indicating the time related to the orientation, based on the position information, the image-capturing time information, and the orientation information, and causes the orientation information and the time information to be displayed together with the flow line information of the object.

(Supplementary Note 3)
The flow line display system according to Supplementary Note 2, wherein the orientation information indicates a time during which a face of the object is positioned in the orientation.

(Supplementary Note 4)
The flow line display system according to Supplementary Note 2 or 3, wherein the display unit displays the orientation information by using a sign and varies the display of the sign, based on the time information.

(Supplementary Note 5)
The flow line display system according to Supplementary Note 4, wherein the display unit varies the sign in size or in color, based on the orientation information.

(Supplementary Note 6)
The flow line display system according to any one of Supplementary Notes 2 to 5, wherein the display unit displays the orientation information and the time information superimposed on the flow line information of the object.

(Supplementary Note 7)
The flow line display system according to any one of Supplementary Notes 2 to 6,
wherein the information-processing device generates line-of-sight information indicating a height of a line of sight of the object from the image of the object, and
wherein the display unit displays the orientation information, the time information, and the line-of-sight information together with the flow line information of the object.

(Supplementary Note 8)
The flow line display system according to any one of Supplementary Notes 2 to 7,
wherein the information-processing device generates speed information indicating a walking speed of the object from the image of the object, and
wherein the display unit displays the orientation information, the time information, and the speed information together with the flow line information of the object.

(Supplementary Note 9)
The flow line display system according to Supplementary Note 8, wherein the display unit displays the flow line information in lines of varied types, based on the speed information.

(Supplementary Note 10)
The flow line display system according to any one of Supplementary Notes 1 to 3, wherein the display unit displays the flow line information of the object in multiple colors according to the orientation information.

(Supplementary Note 11)
A flow line display method comprising:
detecting an object from a captured image;
identifying a flow line of the object, an orientation of the object, and a time related to the orientation; and
displaying the orientation of the object and the time related to the orientation together with the flow line of the object.

(Supplementary Note 12)
The flow line display method according to Supplementary Note 11,
wherein the identifying comprises identifying flow line information of the object and time information indicating the time related to the orientation, based on position information indicating a position of the object, image-capturing time information indicating a time of capturing the image of the object, and orientation information indicating the orientation of the object, and
wherein the displaying comprises displaying the orientation information and the time information together with the flow line information of the object.

(Supplementary Note 13)
The flow line display method according to Supplementary Note 12, wherein the orientation information indicates a time during which a face of the object is positioned in the orientation.

(Supplementary Note 14)
A machine-readable program-recording medium that stores a program for causing a computer to execute:
a detection step of detecting an object from a captured image;
an identification step of identifying a flow line of the object, an orientation of the object, and a time related to the orientation; and
a display step of displaying the orientation of the object and the time related to the orientation together with the flow line of the object.

(Supplementary Note 15)
The program-recording medium according to Supplementary Note 14,
wherein the identification step comprises identifying flow line information of the object and time information indicating the time related to the orientation, based on position information indicating a position of the object, image-capturing time information indicating a time of capturing the image of the object, and orientation information indicating the orientation of the object, and
wherein the display step comprises displaying the orientation information and the time information together with the flow line information of the object.

(Supplementary Note 16)
The program-recording medium according to Supplementary Note 15, wherein the orientation information indicates a time during which a face of the object is positioned in the orientation.

REFERENCE SIGNS LIST

1 Flow line display system
11 Image-capturing unit

12 Information-processing device
13 Display unit
14 Flow line display system
121 Image-processing unit
122 Storage unit
1221 Facial orientation judgment information
1222 Extracted information table
1223 Flow line information table
1224 Size table
1225 Color table
1226 Flow line information table
1227 Extracted information table
1228 Flow line information table
1229 Speed information table
12210 Line information table
1222-1 Position
1222-2 Image-capturing time
1222-3 Facial orientation
1223-1 Output position
1223-2 Facial orientation
1223-3 Output size
1224-1 number of entries
1224-2 Size
1225-1 Number of entries
1225-2 Color
1226-1 Output position
1226-2 Facial orientation
1226-3 Color
1227-1 Position
1227-2 Image-capturing time
1227-3 Facial orientation
1227-4 Height of the line of sight
1228-1 Output position
1228-2 Facial orientation
1228-3 Output size
1228-4 Height of the line of sight
1229-1 Section
1229-2 Speed
12210-1 Speed
12210-2 Line
25 Flow line display system
30 Show case
31 Aisle
32 to 35 Triangular sign
32-1 to 36-1 Arrow
32-2 to 36-2 Roman alphabet letter denoting a direction
34-1 Arrow
34-2 Roman alphabet letter denoting a direction
34-3 Cross sign indicating that the facial orientation is not constant
34-4 Arrow
34-5 Arrow
34-6 Arrow

The invention claimed is:

1. A flow line display system comprising:
at least one memory configured to store instructions; and
at least one processor configured to execute the instructions to:
detect an object from an image;
generate a flow line of the object;
detect an orientation of the object;
determine a duration of time related to the orientation;
determine a feature of a mark based on the orientation of the object and the duration of time related to the orientation; and
display the mark with the determined feature and the detected orientation together with the flow line of the object.

2. The flow line display system according to claim 1, wherein the at least one processor is further configured to:
identify a position of the object, a time of capturing the image, and the orientation of the object,
store position information indicating the position of the object, image-capturing time information indicating the time of capturing the image, and orientation information indicating the orientation of the object in association with one another,
identify flow line information of the object and time information indicating the duration of time related to the orientation, based on the position information, the image-capturing time information, and the orientation information, and
cause the orientation information and the time information to be displayed together with the flow line information of the object.

3. The flow line display system according to claim 2, wherein the orientation information indicates a time during which a face of the object is positioned in the orientation.

4. The flow line display system according to claim 2, wherein the at least one processor is further configured to vary the feature of the mark, based on the time information.

5. The flow line display system according to claim 4, wherein the at least one processor is further configured to vary the feature of the mark by varying size or color of the mark, based on the orientation information.

6. The flow line display system according to claim 2, wherein the at least one processor is further configured to display the orientation information and the time information superimposed on the flow line information of the object.

7. The flow line display system according to claim 2, wherein the at least one processor is further configured to:
generate line-of-sight information indicating a height of a line of sight of the object from the image of the object, and
display the orientation information, the time information, and the line-of-sight information together with the flow line information of the object.

8. The flow line display system according to claim 2, wherein the at least one processor is further configured to:
generate speed information indicating a walking speed of the object from the image of the object, and
display the orientation information, the time information, and the speed information together with the flow line information of the object.

9. The flow line display system according to claim 8, wherein the at least one processor is further configured to display the flow line information in lines of varied types, based on the speed information.

10. The flow line display system according to claim 1, wherein the at least one processor is further configured to display the flow line information of the object in multiple colors according to the orientation information.

11. The flow line display system according to claim 1, wherein the at least one processor configured to execute to:
determine a distance between the object and a show case; and
display the mark, in the case where the distance is less than a predetermined value.

12. The flow line display system according to claim 1, wherein the at least one processor configured to execute to:
determine whether a facial orientation of the object is to be in the direction of a show case; and display the mark, in the case where the facial orientation of the object is to be in the direction of the show case.

13. The flow line display system according to claim 1, wherein the feature of the mark corresponds to size of the mark, and
wherein the at least one processor configured to execute to:
display the mark having a first size based on the duration of time related to the orientation being a first duration of time; and
display the mark having a second size based on the duration of time related to the orientation being a second duration of time,
wherein the first size is different from the second size and the first duration of time is different from the second duration of time.

14. The flow line display system according to claim 1, wherein the feature of the mark corresponds to color of the mark, and
wherein the at least one processor configured to execute to:
display the mark having a first color based on the duration of time related to the orientation being a first duration of time; and
display the mark having a second color based on the duration of time related to the orientation being a second duration of time,
wherein the first color is different from the second color and the first duration of time is different from the second duration of time.

15. A flow line display method comprising:
detecting an object from an image;
generating a flow line of the object;
detecting an orientation of the object;
determining a duration of time related to the orientation;
determining a feature of a mark based on the orientation of the object and the duration of time related to the orientation; and
displaying the mark with the determined feature and the detected orientation together with the flow line of the object.

16. The flow line display method according to claim 15, wherein the identifying comprises identifying flow line information of the object and time information indicating the duration of time related to the orientation, based on position information indicating a position of the object, image-capturing time information indicating a time of capturing the image of the object, and orientation information indicating the orientation of the object, and
wherein the displaying comprises displaying the orientation information and the time information together with the flow line information of the object.

17. The flow line display method according to claim 16, wherein the orientation information indicates a time during which a face of the object is positioned in the orientation.

18. A non-transitory machine-readable program-recording medium that stores a program for causing a computer to execute:
detecting an object from an image;
generating a flow line of the object;
detecting an orientation of the object;
determining a duration of time related to the orientation;
determining a feature of a mark based on the orientation of the object and the duration of time related to the orientation; and
displaying the mark with the determined feature and the detected orientation together with the flow line of the object.

19. The program-recording medium according to claim 18,
wherein the identifying comprises identifying flow line information of the object and time information indicating the duration of time related to the orientation, based on position information indicating a position of the object, image-capturing time information indicating a time of capturing the image of the object, and orientation information indicating the orientation of the object, and
wherein the displaying comprises displaying the orientation information and the time information together with the flow line information of the object.

20. The program-recording medium according to claim 19, wherein the orientation information indicates a time during which a face of the object is positioned in the orientation.

* * * * *